(12) United States Patent
Vasilyuk et al.

(10) Patent No.: US 11,609,346 B2
(45) Date of Patent: Mar. 21, 2023

(54) GNSS-BASED ATTITUDE DETERMINATION ALGORITHM AND TRIPLE-ANTENNA GNSS RECEIVER FOR ITS IMPLEMENTATION

(71) Applicant: Topcon Positioning Systems, Inc., Livermore, CA (US)

(72) Inventors: Nikolay Nikolaevich Vasilyuk, Moscow (RU); Mikhail Yurievich Vorobiev, Moscow (RU); Dmitry Konstantinovich Tokarev, Moscow (RU); Alexandr Vladimirovich Doronin, Moscow (RU); Sergey Ivanovich Tychinskiy, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 1200 days.

(21) Appl. No.: 16/092,114

(22) PCT Filed: May 29, 2018

(86) PCT No.: PCT/RU2018/000348
§ 371 (c)(1),
(2) Date: Oct. 8, 2018

(87) PCT Pub. No.: WO2019/231345
PCT Pub. Date: Dec. 5, 2019

(65) Prior Publication Data
US 2021/0190971 A1 Jun. 24, 2021

(51) Int. Cl.
*G01S 19/54* (2010.01)
*G01C 21/16* (2006.01)
*G01S 19/47* (2010.01)

(52) U.S. Cl.
CPC ............ *G01S 19/54* (2013.01); *G01C 21/165* (2013.01); *G01S 19/47* (2013.01)

(58) Field of Classification Search
CPC ........ G01S 19/54; G01S 19/47; G01C 21/165
See application file for complete search history.

(56) References Cited

U.S. PATENT DOCUMENTS

| 5,548,293 A | 8/1996 | Cohen |
| 6,424,915 B1 | 7/2002 | Fukuda et al. |
| (Continued) | | |

FOREIGN PATENT DOCUMENTS

WO   2005124925 A1   12/2005

OTHER PUBLICATIONS

Search Report in PCT/RU2018/000348, dated Feb. 21, 2019.

*Primary Examiner* — Thomas E Worden
*Assistant Examiner* — Daniel Tyler Reich
(74) *Attorney, Agent, or Firm* — Bardmesser Law Group

(57) ABSTRACT

Determining vehicle orientation based on GNSS signals received by three antennas that are logically combined into two pairs, with one antenna common for both pairs. GNSS receiver measures first carrier phase difference within each pair of antennas, represented as sum of an integer number of periods of the carrier frequency and a fractional part of the period. The fractional parts are used to compute orientation of the vector connecting the antennas phase centers within each pair, excluding integer ambiguity resolution. Vehicle attitude is calculated from the orientation of two non-collinear vectors with a common origin, measured by two pairs of antennas. Each antenna has an RF front end. All RF front ends, heterodynes, digital navigation processors of this receiver are clocked from one common clock oscillator. All carrier phase measurements of the three antennas are performed on a common time scale.

21 Claims, 15 Drawing Sheets

(56) References Cited

U.S. PATENT DOCUMENTS

| | | | | |
|---|---|---|---|---|
| 2005/0242991 | A1* | 11/2005 | Montgomery | G01S 19/39 342/357.36 |
| 2007/0075896 | A1* | 4/2007 | Whitehead | G01S 19/53 342/357.36 |
| 2009/0189804 | A1* | 7/2009 | Ashjaee | G01S 19/14 342/357.27 |
| 2011/0054729 | A1* | 3/2011 | Whitehead | A01B 69/007 701/50 |
| 2017/0031032 | A1* | 2/2017 | Garin | G01S 19/48 |
| 2017/0350988 | A1* | 12/2017 | Nakamura | G01S 19/55 |
| 2018/0341024 | A1* | 11/2018 | Shetty | G01S 19/37 |

\* cited by examiner

GNSS-BASED ATTITUDE DETERMINATION ALGORITHM AND TRIPLE-ANTENNA GNSS RECEIVER FOR ITS IMPLEMENTATION

BACKGROUND OF THE INVENTION

Field of the Invention

The present invention relates to the field of developing attitude determination algorithms based on GNSS (Global Navigation Satellite System) signals and building attitude determining GNSS receivers.

Background of the Related Art

GNSS positioning uses a geocentric coordinate system—Earth Centered Earth Fixed (ECEF)—rigidly related to the rotating Earth. Coordinates of a point relative to ECEF are called "absolute coordinates". It is well known from theoretical mechanics that absolute coordinates of three points, which are rigidly connected to a solid body and not lying on the same line, can fully describe the position and attitude of the body in ECEF. The three points can be logically combined into two pairs, one the points being common for both pairs. A vector can be drawn between each pair of the points, such that its origin would be at the common point. As a result, there are two vectors originating from the same point and not belonging to the same straight line. Coordinates of the vectors, directed from the common point to other chosen points are called "relative coordinates" of these points. Since coordinates may be defined not only in ECEF but also in another coordinate system, any mentioned point should be explicitly referred to the relevant coordinate system (CS). Relative coordinates are assumed to be determined in ECEF if there is no such a reference.

To accurately describe position and orientation of a solid body, absolute coordinates of the three points should not necessarily be indicated. It is sufficient to indicate the absolute coordinates of the common point and relative coordinates of the two other points. The absolute coordinates of the common point specify the position of the solid body relative to ECEF. The relative coordinates of the two points specify the orientation of the solid body relative to ECEF. The common point is assigned in an arbitrary way, its selection is determined by ease and practicality considerations.

A vehicle has its own rigid coordinate system called Body Frame (BF). This reference frame is intended for setting a mutual position of separate vehicle parts and reflects its design features. For example, one axis of a vehicle's body frame is along the longitudinal axis, the second one is perpendicular to the floor, and the third one completes the right orthogonal system. In an airplane one BF axis is directed along the fuselage axis—from tail to nose, the second one is perpendicular to the first axis in the fin plane, and the third one is perpendicular to the first two axes in the wing plane and so on. The origin of the body frame is located at a specific point of the vehicle which is convenient for measurements and practical usage. When one speaks about a position and orientation of the vehicle with respect some CS, one means the position of BF origin and orientation of BF axes relative to this CS, respectively.

When determining position and orientation, the vehicle is regarded as a solid body having three points not lying on the same straight line and rigidly tied to its body. Coordinates of these points relative to BF are assumed known, thereby allowing an unambiguous calculation of the vehicle's position and orientation with the help of measured absolute and relative coordinates of these points.

It is not convenient to orient the vehicle relative to ECEF, since coordinate axes of this frame are not connected with directly observed local reference points, such as a horizontal plane or local vertical. Hence, the vehicle is oriented relative to one of the local coordinate systems, the origin of which is coincides with BF origin, and the CS itself moves together with the vehicle. A typical example of the local coordinate system is East-North-Up (ENU). In ENU, the first and second coordinate axes are in the plane tangent to the Earth's surface and directed towards the East and the North respectively. The tangent plane is called the plane of the local horizon or the horizontal plane. The third axis is vertically directed along the local vertical. ENU orientation changes relative to ECEF when the vehicle moves in reference to Earth's surface but it is unambiguously specified by the vehicle's position relative to ECEF.

The vehicle's orientation relative to the ENU is thus determined in a series of transformations. First, vehicle's position and ENU orientation in reference to ECEF are determined from the absolute coordinates of the common point, and the vehicle's orientation relative to the ECEF—from the relative coordinates. Then, the two sets of parameters are combined and the vehicle's orientation relative to the ENU is determined, the latter then being outputted as a final result.

A GNSS receiver with one antenna measures ECEF-based coordinates of a conditional point called the antenna phase center (PC). If the GNSS antenna is fixed to the vehicle body, the absolute coordinates of the PC are taken as absolute coordinates of this object. It is impossible to measure the attitude of the vehicle using only one GNSS antenna. At least three antennas are needed to determine the GNSS-based vehicle's orientation (to one antenna, two additional antennas located at different points of the body must be added). A mutual arrangement of the antennas in the vehicle should not be changed over time, and the antenna PCs should not belong to the same line. In this case, the three PCs become three noncollinearity points determining the vehicle's position and orientation. The vehicle's position (or its absolute coordinates) are determined by such an antenna whose PC is assigned as the common point. This antenna is called the master antenna. The vehicle's orientation is determined by the relative coordinates of the PCs of the two other antennas. These antennas are called slave antennas.

An obvious way of determining relative coordinates of the slave antennas is the GNSS measurements of the absolute coordinates for each of the three antennas at the same time and then subtracting of the master antenna's absolute coordinates from the absolute coordinates of each slave antenna. However, such a measuring system can be technically impractical from the point of a required accuracy of the orientation. For example, a typical RMS of measuring absolute coordinates for an antenna in a GNSS receiver operating in a stand-alone mode without additional correction information can be about 2-4 meters. To achieve 1 degree RMS for an orientation, master and slave antennas should be 160 meters apart. Such a distance between antennas is obviously impractical for most vehicles.

If a GNSS receiver is capable to receive real time corrections from external sources, it can operate in differential positioning modes: Differential GPS (DGPS) or Real Time Kinematic (RTK). Such a receiver is called a rover. Corrections are transmitted to the rover via a wireless communications line from another GNSS receiver, whose position is constant and absolute coordinates are well known. Such a receiver is called the fixed base. Typical RMS of rover absolute coordinates in DGPS mode is 15-20 cm, and 2-3 cm in RTK mode. Heading at 1 degree RMS in DGPS mode can be obtained when antennas are approximately 1.3 meters apart from each other, and in RTK mode—about 17 cm apart. Therefore, a reasonable method of determining relative coordinates of slave antennas at common-sense technical requirements to distances between master and slave antennas can be implemented for a rover in RTK mode. To do this, the rover needs an uninterrupted communications line with the fixed base distant from the rover no longer than 20 km, which is not always possible.

A common method of overcoming difficulties in heading determination without differential corrections is the moving base RTK method. Only relative coordinates of slave antennas are determined in this method with high accuracy (RMS 2-3 cm). Different positioning modes of the GNSS receiver to which master antenna is connected can be used, including stand-alone. This receiver, called the moving base, is used to generate corrections for two other receivers (rovers) with connected slave antennas. Rovers in this case are close to the moving base and a stable high-speed connection is installed between them. The attitude's measurements accuracy provided by this method does not depend on availability or unavailability of a communications line with an external base station. However, to implement this method, three full-function GNSS receivers each of which is connected to its own antenna are needed. On the other hand, such an approach does not require special features of receiver hardware and can be implemented with any modern multi-purpose GNSS receivers. The minimal number of navigation space vehicles (Satellites) needed for attitude determination in the fixed-base RTK method and in the moving base RTK method is four.

Another known method of a GNSS-based heading determination is called GNSS interferometry. This method is based on simultaneous measurements of GNSS carrier phases received by three spaced antennas. The antennas are connected to a GNSS receiver specially designed for this method. In this receiver, all RF front ends, heterodynes, base-band processors are clocked from the same clock oscillator. In this case the carrier phases received by the three different antennas are measured and processed based on a common time scale. The method of co-processing some signals from different sources based on processing signal phases measured according to the common time scale is called a coherent signal processing.

The measured full carrier phase can be presented in the form of a sum of the true full phase, fluctuation error of measuring the full phase, the offset error of receiver's scale in reference to the GNSS clock and the random constant integer number of carrier cycles (integer ambiguity). The true value of the full phase is the number of carrier cycles between PC of the transmitting antenna and PC of the receiving antenna from the moment of signal transmission by the transmitting antenna up to the moment of its reception by the receiving antenna. It is the true phase that carries information about a spatial position of the PC of the receiving antenna. The fluctuation error of measuring the full phase is caused by signal delays in the atmosphere, equipment, thermal noise, multipath reflections, etc. Integer ambiguity occurs at the moment of switching the receiver and is a random carrier cycle integer accumulated in the process of algorithm initialization, clock generator start and so on.

A specialized receiver measures three full phases of each GNSS signal received by master and slave antennas at the same time. Then, the full phases received by the master antenna are subtracted from the full phases of those signals received by each slave antenna. Since phase measurements determined by the specialized receiver are performed according to the common time scale, all systematic errors, with the exception of integer ambiguities, were compensated in subtracting of full carrier phases. The obtained differences are the differences of the true full phases disturbed by fluctuation errors. They also include some additives in the form of undetermined carrier cycle integers. Integer ambiguities are calculated by special algorithms well known in satellite navigation. The same algorithms of resolving ambiguities are used in RTK with fixed base and moving-base RTK algorithms.

Integer ambiguities are stored, as rule, during a long periods of continuous receiver operation. Hence, the procedure of resolving integer ambiguities is necessarily performed at the start of the attitude determination algorithm. Changes in integer ambiguities occur abruptly at random discrete time instants and are called cycle slips. The receiver continuously checks if cycle slips occurred in the latest full phase, and when the cycle slip is detected, the procedure of resolving ambiguities is started again.

The calculated integer ambiguity is subtracted from each newly obtained difference of the measured full carrier phases, and, as a result, a difference of the true full carrier phases disturbed by only measuring noise is obtained. This difference is used in determining the vehicle's attitude.

A GNSS signal from the phase center of the transmitting antenna of the navigation satellite is received by a ground vehicle in the form of a flat wave front. If three separate antennas simultaneously receive the GNSS signal from the same satellite, the difference of true full carrier phases between master and slave antennas is solely determined by a path difference between the PCs of these antennas. The path difference is unambiguously determined by the satellite angular coordinates relative to the master antenna and the spatial orientation of the vehicle's body onto which the three antennas are located.

To obtain satellite angular coordinates relative to the master antenna, the GNSS receiver measures absolute PC coordinates and calculates SV absolute coordinates at the moment of signal transmission. As the satellite is considerably distant, errors in PC absolute coordinates are very slightly affected by SV angular coordinate errors. For example, these errors are about 0.04 angular second for the less accurate standalone positioning mode, which is negligibly small for determining vehicle's orientation. Satellite absolute coordinates are calculated from its almanac.

Thus, for each satellite, whose signal is simultaneously received by the three antennas, inside the receiver two differences of true full carrier phases are generated (one difference for each antenna pair). These two measured values are functionally connected to the three parameters of vehicle's attitude. If the tri-antenna system receives signals from two satellites at the same time, the receiver generates four measured carrier phase differences related to the three orientation parameters. It means that in the case of two and more satellites the receiver will have a redundant set of measurements which allows writing the equation system for the three orientation parameters. This overdetermined equation system is solved by a known non-linear least square method. The minimal number of satellites for a receiver to determine vehicle's orientation with the GNSS interferometry method is equal to two (against four according to the above considered methods).

Conventional methods of attitude determination with the aid of GNSS signals described above require integer ambiguity resolution. This resolution is time-consuming and requires a great deal of processor resources. This expenditure of processor's resources may be acceptable only for the first start of the attitude determination algorithm. But the integer ambiguity resolution for all these attitude determination methods must be repeated after each loss of GNSS signal. Until the integer ambiguity is resolved, the vehicle's attitude solution will be unavailable. This "dead time" without attitude solution may be unacceptable for vehicles in motion, especially for rapidly maneuvering vehicles.

The present application is directed to solving this "dead time" problem by the completely excluding the integer ambiguity resolution from the restoration of attitude solution after each GNSS signals outages. The essence of this new approach is to calculate the vehicle's attitude from fractional parts of carrier phase differences. These fractional parts do not contain any integer phases components and attitude solution may be restored immediately after restoration of GNSS signals reception (after outage). But this fast attitude solution restoration becomes possible due to extremely strict requirements to the seeding of the attitude calculation algorithm.

SUMMARY OF THE INVENTION

The invention relates to a method of determining the vehicle's attitude based on the GNSS interferometry method and a tri-antenna GNSS receiver for its implementation. Three antennas are assumed to be arranged on the vehicle so that their PCs do not belong on the same straight line. The three antennas are logically combined into two pairs. The antenna common for both pairs is called the master antenna, and the two others are called slave antennas. A vector whose origin coincides with the master antenna's PC and the end—with the PC of the slave antenna is called the base vector. Thus, the described tri-antenna configuration has two non-collinear base vectors originated from the same common point.

Full carrier phases at the output of each antenna are measured for each GNSS signal received by a pair of master-slave antennas at the same time. Then a difference is calculated between measured full carrier phases of signals received by the master and slave antennas. The difference of true full phases between the master and slave antennas is uniquely determined by a path difference of beams connecting the PC of the satellite antenna at the moment of radiation and the PC of the receiving antennas at the moment of measuring full phases of the same signal. As the satellite is far away from the vehicle, two beams connecting the transmitting antenna with one of the two receiving antennas are considered parallel.

Then, the path difference of this parallel pair of the beams is uniquely determined by spatial orientation of the base vector. The spatial orientation of any vector is described by two parameters. That is why one needs two path differences from two pairs of the beams from different directions to determine a spatial orientation of the base vector using path differences of beams coming to the beginning and ending points of the vector. Such pairs of beams can be taken from two satellites, the PCs of the transmitting antennas and the PC of the receiving antenna not lying on the same line. To determine the spatial orientation of the base vector, the master and slave antennas need to receive signals from at least two satellites. The more satellites are available for simultaneous signal reception, the better accuracy of the base vector orientation parameters will be. This base vector averages measuring errors during processing redundant measurements. In this case two parameters of base vector orientation are calculated based on the whole set of full phase differences using the non-linear least squares method (NLSM).

True full phase differences distorted by random noise are used as measured values substituted in NLSM in known implementations of the GNSS interferometry method. To obtain such values, the procedure of resolving integer ambiguities needs to be executed. Calculated integer ambiguities are further subtracted from each newly-obtained full phase difference to generate a difference of true full carrier phases. The receiver permanently tracks the stability of the calculated integer ambiguity, and if it changes, the procedure of resolving the integer ambiguities is repeatedly run. When a short-term interruption of GNSS signals is detected, the receiver also starts the procedure of resolving the integer ambiguities.

Another method of generating phase differences for NLSM is proposed, different from the known GNSS interferometry implementations. Here, a measured full carrier phase difference is presented as a sum of integer carrier cycles and a fractional cycle part. When there is no random noise, the fractional part of the measured full carrier phase difference is equal to the fractional part of the true full carrier phase difference, and the integers of these differences differ in the integer ambiguity. The proposed method utilized only fractional parts of all available full phase differences as measured values in NLSM, and integers are not considered. The proposed algorithm does not take into account integer ambiguity in processing measurements and hence there is no need to provide actual values of the ambiguity. This is an advantage compared to existing methods, because there is no need to constantly control changes in integer ambiguity and to restart the procedure of resolving integer ambiguities when they have been changed.

Two angular coordinates determined relative to ENU are used in the described algorithm as orientation parameters of the base vector. The first angle is the azimuth angle $\alpha$, the angle between base vector projection onto the horizontal plane and the direction towards North. The second angle is the elevation angle $\beta$, the angle between the base vector and the horizontal plane.

NLSM determines angles $\alpha$ and $\beta$ such that the likelihood function reaches a local maximum. Note that in all known GNSS interferometry method versions with the integer ambiguities resolution, the likelihood function has only one local maximum coinciding with its global maximum. Unlike these schemes, in the proposed method without the integer ambiguities resolution, the likelihood function has multiple local maxima. Only one of these maxima is achieved at the true values of angles $\alpha$ and $\beta$. This local maximum is called the true local maximum, all the rest maximum are called false maxima. When NLSM falls in the vicinity of any false maximum, angles $\alpha$ and $\beta$ are incorrectly determined. To resume operability of the proposed algorithm after interrupting GNSS signals, repeated NLSM initialization is performed such that the original values of angles $\alpha$ and $\beta$ would be close to the local maximum.

Any method of determining base vector orientation enabling to assign angles $\alpha$ and $\beta$ different from the true maximum by a few degrees can be used to repeatedly initialize NLSM. One embodiment of the proposed method uses the moving-base RTK method initiated only once at the moment of the repeated initialization. Another embodiment uses some information about base vector orientation provided by Inertial Measurement Unit (IMU) for repeated initialization. The IMU allows an extrapolation of the vehicle's orientation during the whole period of no-signal gap. At the time of the repeated initialization NLSM, the initial values of angles α and β are calculated from the extrapolated BF orientation and from known coordinates of the base vector relative to BF.

Each pair of antennas in a tri-antenna configuration can generally receive not matching sets of GNSS signals. In this case angular coordinates of two non-collinear base vectors are determined at the same time, independently and according to different sets of GNSS-measurements. As a result of these measurements, two sets of coordinates for two vectors referenced to the same time moment are obtained. The first set is the coordinates of the base vectors in the vehicle's BF which are highly accurate, do not vary in time, and can be uploaded in the receiver firmware at the step of system installation. The second set is the coordinates of the same vectors relative to ENU which have been obtained in GNSS-measurements and distorted by measuring errors. The attitude problem based on noisy coordinates of some non-collinear vectors is well known in navigation as the Wahba problem [1]. For two vectors this problem is a simple determination of attitude base on two vector measurements obtained from two pairs of GNSS-antennas.

There are different ways to get two sets of measured coordinates for a tri-antenna system. In one embodiment these measurements are obtained within the system consisting of two similar dual-antenna receiver. Each receiver is capable of measuring angular coordinates of the base vector between its pair of antennas. In such a system the master antenna is connected to one of similar antenna inputs of both receivers. A single slave antenna is connected to the other antenna input of each receiver. Angular coordinates of the base vector determined by one receiver can be transmitted to another receiver connected to the other pair of antennas. To calculate attitude, the obtained measurements in this receiver are combined with its own measurements of angular coordinates from its own pair of antennas. In another embodiment simultaneous measurements of angular coordinates of the base vectors are transmitted to a separate host processor calculating the attitude.

In one more embodiment angular coordinates are measured based on one tri-antenna receiver. In this receiver each antenna is connected to its own RF front end. The three RF front ends are connected to the common digital navigation processor which processes a navigation signal, calculates full carrier phase differences between antenna pairs, and finally—determines attitude and heading of a vehicle.

In another embodiment of the tri-antenna receiver, three RF front ends are connected to two digital navigation processors. One RF front end from one slave antenna is connected to each digital navigation processor. The RF front end corresponding to the master antenna is connected to both digital navigation processors simultaneously. Each digital navigation processor determines a position of the master antenna and angular coordinates of its base vector. One of the digital navigation processors transmits its measurements of position and angular coordinates to the other which calculates a full set of measurements for vehicle's attitude and heading.

Also it is possible to connect both digital navigation processors to the common host processor placed inside the tri-antenna GNSS receiver. These digital navigation processors transmit their measurements to the host processor to calculate the vehicle's attitude.

To measure the carrier phases, dual- and tri-antenna receivers need to satisfy the following conditions. RF front ends, heterodynes, tracking loops and digital navigation processors receiving signals from each antenna pair should be clocked by a common clock oscillator. In this case systematic errors of measuring full carrier phases at the output of each antenna will be equal within the pair and be compensated in subtraction.

Synchronization of the RF front ends and the digital navigation processor from the common clock oscillator in the dual-antenna receiver can be done only within this receiver. There is no need to synchronize clock signals between two dual-antenna receivers combined into an attitude determination system. In a tri-antenna receiver, the RF-front end connected to the master antenna simultaneously measures angular coordinates of the both base vectors. Hence, all the three RF front ends need to be synchronized with the same clock oscillator. Moreover, all the tracking loops and digital navigation processors of the tri-antenna receiver need to be also synchronized with it, irrespective of its implementation.

There are different methods of building systems and attitude algorithms with multi-antenna systems simultaneously receiving GNSS signals. [2] discloses an attitude determination system based on processing phase measurements from three spaced antennas. The distance between at least one antenna pair in this system needs to be smaller than the carrier wavelength. Attitude is calculated by processing double differences of full carrier phases constructed between signals received by the three antennas. The system allows the use of inclinometers in the process of attitude determination. The inclinometers can be used as orientation sensors only with a stationary base, thus, such a system is suitable solely for attitude determination of nonmoving objects. It should be noted that in the proposed invention GNSS-component does not limit distance between antennas and uses the fractional parts of carrier single differences between antennas. GNSS and IMU integration proposed in the proposed solution is operable both for moving and nonmoving platforms. Hence, the proposed solution can be used for attitude determination of a moving object.

[3] describes a GNSS-based attitude determination system received signals by four antennas at the same time. To process signals, one of the four antennas is selected as a master antenna, all the other antennas are used as slaves. A movable object, whose attitude is determined, is considered flexible, so mutual position of antennas can slightly change. The algorithm calculates a change in mutual position and attitude of the movable objects by co-processing full phase differences between each pair of the master-slave antennas accumulated over some successive epochs. Integer ambiguities are determined for each calculated set of attitude and mutual position parameters for all accumulated carrier (phase) differences. However, this algorithm requires four antennas, rather than three. The proposed algorithm does not use integer ambiguity at the current attitude determination. And, therefore, there is no need to accumulate measurements over some successive epochs, since it determines attitude based on simultaneous measurements obtained for each epoch. Moreover, it does not require to estimate any change in mutual position of slave antennas with respect to the master antenna.

[4] describes an attitude determination system with a number of GNSS-antennas arranged such that their longitudinal axes are not parallel. The non-parallel alignment of axes results in additional phase incursion between master and slave antennas, which is calculated and corrected by the algorithm when double differences are constructed. In this algorithm all the three attitude angles are calculated at once, without intermediate separate calculation of single baseline attitudes. Such an approach does not allow to build a full attitude system by combining two systems with partial attitude determination, which is proposed in the present invention. The approach in [4] also requires permanent determination of integer ambiguity—unlike the proposed invention.

[5] describes an attitude determination system with a multi-antenna GNSS subsystem and an IMU. Measurements from the GNSS and the IMU are integrated by two ways—by a Kalman filter and by a complementary filter. When the attitude changes, the GNSS system uses changes in full phases simultaneously received by all antennas. Then, 9 coefficients of the directional cosines matrix describing vehicle's attitude are determined on the basis of these changes with the iteration least squares method. A drawback of this approach is the necessity of constant matrix orthogonalization formed by these nine coefficients. The algorithm also requires integer ambiguity resolution for making an equation system for matrix coefficients. The proposed invention assumes all coefficients of the cosine matrix to be dependent on the three independent variables. So, only three independent variables need to be defined which can save computational resources and avoid forced orthogonalization of the obtained attitude matrix mentioned in [5]. The proposed invention does not also use integer ambiguity resolution and solutions are quickly resumed with the help of IMU measurements.

[6] describes a tri-antenna GNSS-system, integrated with an IMU. The three antennas receive GNSS signals at the same time and carrier single and double differences are constructed on their basis. Integer ambiguities are determined in these differences, and relative coordinates of two slave antennas are further calculated by the moving-base RTK method. Object attitude is then determined from these relative coordinates. If the GNSS signals are unavailable, the vehicle's attitude is extrapolated by the IMU data. When the GNSS signal resumes, relative coordinates of the slave antennas are calculated based on the extrapolated attitude. Relative calculated coordinates are used for fast determination of integer ambiguities and repeated start-up of the moving-base RTK algorithm. It should be noted that the proposed invention applies a special version of the GNSS interferometry method without integer ambiguity (the moving base RTK method is used in [6]). Also, the proposed invention uses IMU data for rough initialization of NLSM rather than for calculation of integer ambiguity.

[7] describes an attitude determination system including a dual-antenna GNSS receiver measuring two of three attitude angles of the vehicle's attitude. To obtain a complete orientation, these angles are integrated with IMU data using a Kalman filter. The distance between antennas must not to be longer than three wavelengths of the received signal, or 150 mm Base vector attitude between two antennas is determined by a standard GNSS interferometry method with integer ambiguity resolution. Calculation of integer ambiguity at the moment of initial or repetitive initialization of the algorithm is performed by the known procedure called the transfer alignment which is used when a vehicle moves at variable speed. The proposed invention uses two base vectors (three antennas), whose angular coordinates are obtained by a special version of the GNSS interferometry method without integer ambiguity. The IMU data in the proposed invention are also used for rough initialization of NLSM, rather than for transfer alignment procedure. It allows quick re-initialization of the proposed algorithm even in case of an unmoving vehicle.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings comparison of optimal and non-optimal constellation choices is illustrated:

DETAILED DESCRIPTION OF EMBODIMENTS OF THE INVENTION

Reference will now be made in detail to the embodiments of the present invention, examples of which are illustrated in the accompanying drawings.

Figure 1:
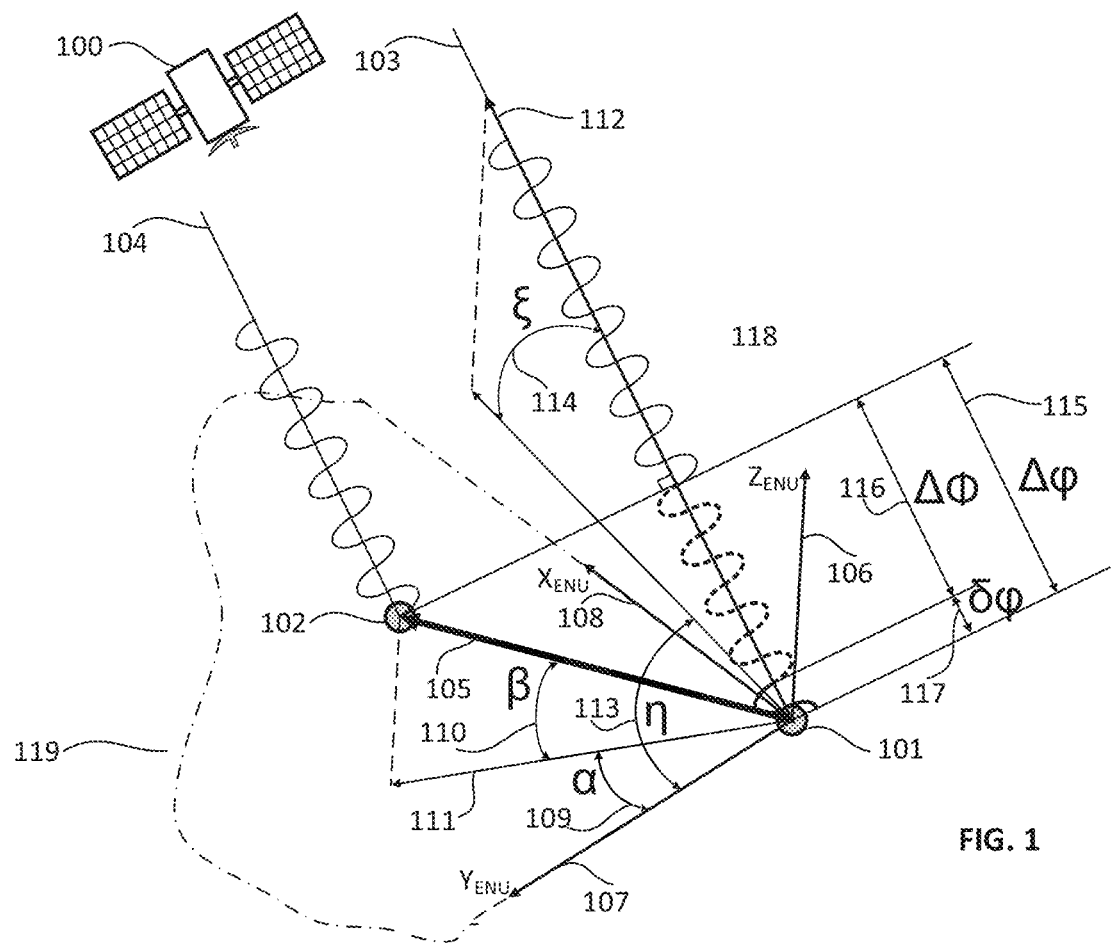
FIG. 1 shows a first difference of true values of full phases of the carrier frequency measured by one pair of master and slave antennas.

FIG. 1 shows a structure of the first difference of the true values of the full phases of the carrier frequency measured by one pair 118 of master antenna 101 and slave antennas 102. The navigation satellite 100 transmits the navigation signal, which is simultaneously received by the master antenna 101 and the slave antenna 102. The GNSS satellites may be any of, e.g., GPS, Galileo, ZQZZ, GLONASS or BEIDOU, and can transmit on any of the bands GPS L1, L2, L5;
Galileo L1, L2, E5a, E5b;
QZSS L1, L2, L5, E6;
GLONASS L1, L2, L3;
BEIDOU B1, B2, B3.

Because the navigation satellite 100 is placed very far from both receiving antennas, signal propagation paths may be considered as two parallel rays 103 (received by the master antenna 101) and 104 (received by the slave antenna 102). The origin of the base vector 105 is placed in the PC of the master antenna 101 and the end of this vector is placed in the PC of the slave antenna 102.

The attitude of the base vector 105 is considered with respect to a local frame ENU. The ENU coordinate axes $X_{ENU}$, $Y_{ENU}$, $Z_{ENU}$ originate from the PC of the master antenna 101. The $Z_{ENU}$ axis 106 is directed towards vertically up along the perpendicular to the Earth ellipsoid. The $Y_{ENU}$ axis 107 is perpendicular to the $Z_{ENU}$ axis 106 and directed to the North pole along the meridian. The $X_{ENU}$ axis 108 is perpendicular to the $Z_{ENU}$ axis 106 and directed to the East. The $X_{ENU}$ axis 108 complements the ENU frame to the right orthogonal. The axes $X_{ENU}$ 108 and $Y_{ENU}$ 107 form the local plane 119 (or the plane of the local horizon 119).

To describe the attitude of the base vector 105, angular coordinates with respect to ENU (the azimuth angle α 109 and the elevation angle β 110) are used. The azimuth angle α 109 is determined as the angle between $Y_{ENU}$ axis 107 and the orthogonal projection 111 of the base vector 105 onto the local plane. The elevation angle β 110 is determined as the angle between the base vector 105 and its orthogonal projection 111 onto the local plane.

Direction towards the satellite 100, which is visible from the PC of the master antenna 101 is described by the direction vector 112. This direction vector 112 originates from the PC of master antenna 101 and directed to the PC of the transmitting antenna of the satellite 100. The angular coordinates of this vector are described by an azimuth angle η 113 and an elevation angle ξ 114. The rules of determination of these angles are the same as for angles α 109 and β 110 respectively.

The master antenna 101 and the slave antenna 102 receive the true values of the full carrier phases $\varphi_M$ and $\varphi_S$ respectively. The $\varphi_M$ is the number of carrier frequency periods (number of cycles) between the PC of the transmitting antenna of the satellite 100 and the PC of the master antenna 101 along the ray 103. The $\varphi_S$ is the number of cycles between the PC of the transmitting antenna of the satellite 100 and the PC of the slave antenna 102 along the ray 104. The path difference $\Delta\varphi = \varphi_M - \varphi_S$ 115 between master and slave antennas may be represented as a sum $\Delta\varphi = \Delta\Phi + \delta\varphi$. The integer value $\Delta\Phi$ 116 is the number of full cycles of the carrier frequency. The fractional value $\delta\varphi = \Delta\varphi - \text{round}\{\Delta\varphi\}$ 117 is the fractional part of one cycle of the carrier frequency.

The relationship between the attitude parameters of the vectors 105 (angles α 109 and β 110) and 112 (angles η 113 and ξ 114) and the path difference $\Delta\varphi$ 114 has the following form:

$$\Delta\varphi = \frac{D}{\lambda}(s_\eta c_\xi s_\alpha c_\beta + c_\eta c_\xi c_\alpha c_\beta + s_\xi s_\beta) \quad (1)$$

where: D—the length of the base vector 105; λ—a wavelength of the carrier signal; $s_x \equiv \sin(x)$; $c_x \equiv \cos(x)$.

If the master antenna 101 and the slave antenna 102 simultaneously receive navigation signals from N different satellites the equation (1) should be repeated for each visible satellite:

$$\begin{cases} \Delta\varphi_1 = \frac{D}{\lambda}(s_{\eta_1} c_{\xi_1} s_\alpha c_\beta + c_{\eta_1} c_{\xi_1} c_\alpha c_\beta + s_{\xi_1} s_\beta) \\ \Delta\varphi_2 = \frac{D}{\lambda}(s_{\eta_2} c_{\xi_2} s_\alpha c_\beta + c_{\eta_2} c_{\xi_2} c_\alpha c_\beta + s_{\xi_2} s_\beta) \\ \vdots \\ \Delta\varphi_N = \frac{D}{\lambda}(s_{\eta_N} c_{\xi_N} s_\alpha c_\beta + c_{\eta_N} c_{\xi_N} c_\alpha c_\beta + s_{\xi_N} s_\beta) \end{cases} \quad (2)$$

where: $\Delta\varphi_i$, $\eta_i$, $\xi_i$ is the path difference, the azimuth angle and the elevation angle for the satellite with number i=1 ... N.

The set of nonlinear equations (2) is the base for determination of the azimuth angle α 109 and the elevation angle β 110 of the base vector 105 by the Nonlinear Least Squares Method.

The system of equations (2) can be written in a vector-matrix form as $\Delta\varphi = f(\eta, \xi, \alpha, \beta)$, where $\Delta\varphi = [\Delta\varphi_1 \ldots \Delta\varphi_N]^T$—a vector of path differences, $\eta = [\eta_1 \ldots \eta_N]^T$—a vector of satellites' azimuths, $\xi = [\xi_1 \ldots \xi_N]^T$—a vector of satellites' elevations, $f(\eta, \xi, \alpha, \beta)$—a vector function representing the right-hand side of equations (2) with all available wavelength λ. Taking into consideration a measurement noise, a simple measurement model for phase differences results:

$$\Delta\varphi = f(\eta, \xi, \alpha, \beta) + \varepsilon \quad (3)$$

where: $\Delta\varphi$—the vector of measured path differences; $f(\eta, \xi, \alpha, \beta)$ is the vector of calculated path differences for wavelength λ; $\varepsilon = [\varepsilon_1 \ldots \varepsilon_N]^T$ is a vector of normally distributed and independent noise samples with diagonal covariance matrix $R = \text{diag}\{\sigma_1^2, \ldots, \sigma_N^2\}$; $\sigma_i^2$ is a variance of carrier phase difference measurement with number i=1 ... N.

The equation system (3) is overdetermined and contains some random components ε. This equation system has no exact solution and must be solved by some numerical method which minimizes the solution error. The NLSM is a possible approach to solve this system and find $\hat{\alpha}$, $\hat{\beta}$ values when quadratic error function $(\Delta\varphi - f(\eta, \xi, \alpha, \beta))^T R^{-1} (\Delta\varphi - f(\eta, \xi, \alpha, \beta))$ reaches a minimum:

$$\hat{\alpha}, \hat{\beta} = \arg \min_{\substack{\alpha \in [0, 360°) \\ \beta \in (-90°, 90°)}} \{(\Delta\varphi - f(\eta, \xi, \alpha, \beta))^T R^{-1} (\Delta\varphi - f(\eta, \xi, \alpha, \beta))\} \quad (4)$$

To find the NLSM-solution of (3) meets the criteria (4) this system must be linearized near some intermediate solution $\hat{\alpha}_{i-1}$, $\hat{\beta}_{i-1}$ received at previous iteration with number i−1:

$$\Delta\varphi \approx f(\eta, \xi, \hat{\alpha}_{i-1}, \hat{\beta}_{i-1}) + H_{i-1} \delta x_i + \varepsilon \quad (5)$$

where: i=1 ... $N_{max}$—a number of current iteration; $N_{max}$—a maximum number of iterations;

$$H_{i-1}\left[\frac{\partial f(\eta, \xi, \hat{\alpha}_{i-1}, \hat{\beta}_{i-1})}{\partial \alpha} \frac{\partial f(\eta, \xi, \hat{\alpha}_{i-1}, \hat{\beta}_{i-1})}{\partial \beta}\right]$$

is the Jacobian matrix at point $\hat{\alpha}_{i-1}$, $\hat{\beta}_{i-1}$; $\delta x_i$—an unknown correction for intermediate solution $\hat{\alpha}_{i-1}$, $\hat{\beta}_{i-1}$.

The equation system (5) is overdetermined and linear and may be solved by Linear Least Squares Method:

$$\delta \hat{x}_i = (H_{i-1}^T R^{-1} H_{i-1})^{-1} H_{i-1}^T R^{-1} [\Delta\varphi - f(\eta, \xi, \hat{\alpha}_{i-1}, \hat{\beta}_{i-1})]. \tag{6}$$

Now the NLSM-solution of (3) for a current iteration with number i may be received:

$$\begin{bmatrix} \hat{\alpha}_i \\ \hat{\beta}_i \end{bmatrix} = \begin{bmatrix} \hat{\alpha}_{i-1} \\ \hat{\beta}_{i-1} \end{bmatrix} + \delta \hat{x}_i. \tag{7}$$

The iteration process (5)-(7) stops when some norm (parameter) $\|\delta \hat{x}_i\|$ becomes less than a predefined threshold. Values $\hat{\alpha}_i$, $\hat{\beta}_i$ received after last iteration are interpreted as NLSM-solution of (3): $\hat{\alpha} = \hat{\alpha}_i$, $\hat{\beta} = \hat{\beta}_i$. If the iteration number i reaches the $N_{max}$ before $\|\delta \hat{x}_i\|$ becomes less than the predefined threshold, this indicates a problem in the numerical convergence of the algorithm. But the function f ($\eta$, $\xi$, $\alpha$, $\beta$) (or its explicit form (2)) is quite smooth, therefore all convergence problems of iteration process (5)-(7) are caused by incorrect initial values $\hat{\alpha}_0$, $\hat{\beta}_0$ before iterations start.

Since the problem of initial values $\hat{\alpha}_0$, $\hat{\beta}_0$ plays an important role in this discussion, it needs to be described more carefully. In fact, NLSM finds such $\hat{\alpha}$, $\hat{\beta}$ values at which the logarithmic likelihood function for measurement model (3) reaches the local maximum:

$$\hat{\alpha}, \hat{\beta} = \arg \min_{\substack{\alpha \in [0, 360°) \\ \beta \in (-90°, 90°)}} L(\Delta\varphi \mid \eta, \xi, \alpha, \beta)$$

where:

$$L_C(\Delta\varphi \mid \eta, \xi, \alpha, \beta) = -\frac{1}{2}(\Delta\varphi - f(\eta, \xi, \alpha, \beta))^T R^{-1}(\Delta\varphi - f(\eta, \xi, \alpha, \beta))$$

is the logarithmic likelihood function (3) with parameters $\alpha$, $\beta$.

The discrepancy between initial values $\hat{\alpha}_0$, $\hat{\beta}_0$ and true values $\alpha_{TRU}$, $\beta_{TRU}$ of the base vector 105 attitude angles is limited by a shape and a size of the local maximum of the likelihood function $L_C$ ($\Delta\varphi|\eta$, $\xi$, $\alpha$, $\beta$). If this discrepancy is too big the iterations (5)-(7) can converge to wrong solution or even diverge.

Figure 2:
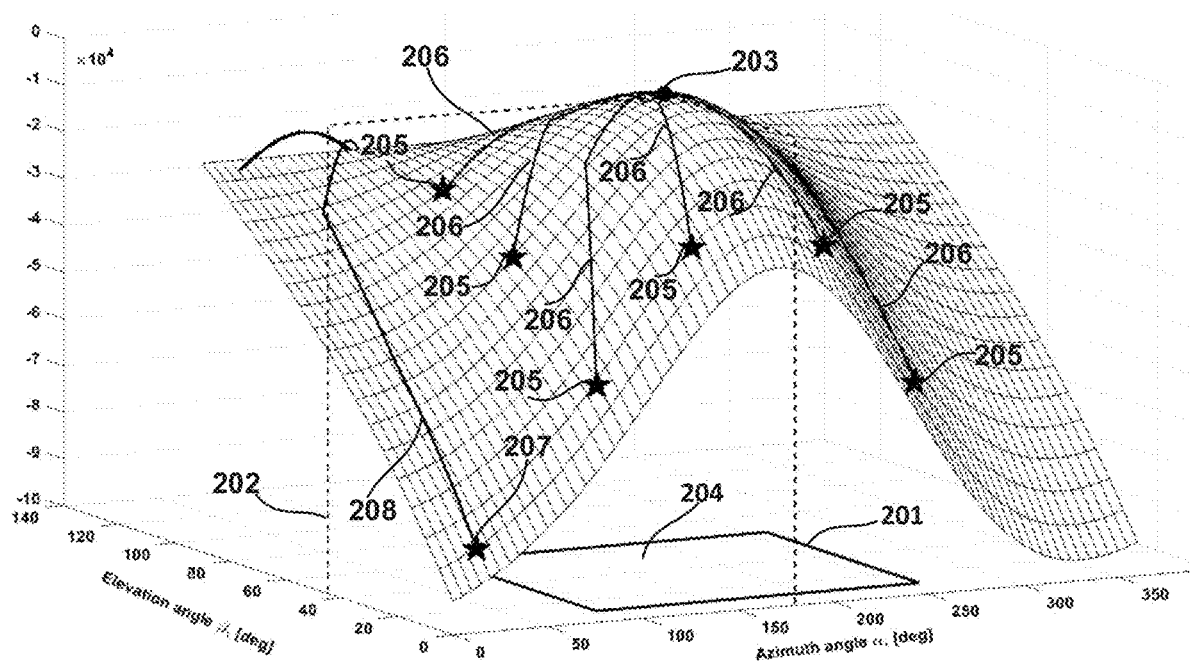
FIG. 2 shows a typical view of a unimodal likelihood function for the base vector attitude determination by differences of full carrier phases.

FIG. 2 shows a typical shape view of the likelihood function $L_C$ ($\Delta\varphi|\eta$, $\xi$, $\alpha$, $\beta$) for $\alpha_{TRU}=180°$ 201, $\beta_{TRU}=45°$ 202, D=1 m and $\lambda_{L1}=0.19$ cm. This function has only one local maximum 203 which is located at true values $\alpha_{TRU}$, $\beta_{TRU}$ of $\alpha$, $\beta$. In the case of only one maximum of likelihood function the discrepancy between the initial values $\hat{\alpha}_0$, $\hat{\beta}_0$ and the true values $\alpha_{TRU}$, $\beta_{TRU}$ may be significant. For this case range 204 of initial values $|\alpha_{TRU} - \hat{\alpha}_0| \leq 90°$, $10° \leq \hat{\beta} \leq 65°$ is acceptable. All initial values 205 located inside this range provide correct convergence trajectories 206 which lead to $\alpha_{TRU}$, $\beta_{TRU}$. But taking the initial values $\hat{\alpha}_0 = 20°$, $\hat{\beta}_0 = 6°$ 207 outside this range results in a divergent trajectory 208, which has no finite limit.

The likelihood function with single maximum is the typical case for well-known GNSS interferometry methods of base vector 105 attitude determination. In these methods, each measured path difference $\Delta\varphi$ 114 is considered in its full form-as a sum of integer part $\Delta\Phi$ 116 and fractional part $\delta\varphi$ 117. These methods require a carrier phase integer ambiguity resolution to calculate $\Delta\varphi$ correctly.

Replacing the full differences vector $\Delta\varphi - f$ ($\eta$, $\xi$, $\hat{\alpha}_{i-1}$, $\hat{\beta}_{i-1}$) inside iteration procedure (5)-(7) with its fractional part allows to remove the carrier phase integer ambiguity resolution. With this operation, equation (6) will change and look as follows:

$$\delta \hat{x}_i = (H_{i-1}^T R^{-1} H_{i-1})^{-1} H_{i-1}^T R^{-1} q_{i-1} \tag{8}$$

where: $q_{i-1} = \Delta\varphi - f$ ($\eta$, $\xi$, $\hat{\alpha}_{i-1}$, $\hat{\beta}_{i-1}$)—round $\{\Delta\varphi - f$ ($\eta$, $\xi$, $\hat{\alpha}_{i-1}$, $\hat{\beta}_{i-1}$)$\}$—the fractional of difference between calculated and measured path differences.

The new NLSM iteration procedure consists of sequential computation of steps (5), (8), (7). The logarithmic likelihood function for new iteration procedure is $$L_F(\Delta\varphi \mid \eta, \xi, \alpha, \beta) = -\frac{1}{2} d^T R^{-1} d,$$

where $q = \Delta\varphi - f$ ($\eta$, $\xi$, $\alpha$, $\beta$)—round $\{\Delta\varphi - f$ ($\eta$, $\xi$, $\alpha$, $\beta$)$\}$ is the fractional part of difference between calculated and measured path differences.

Figure 3:
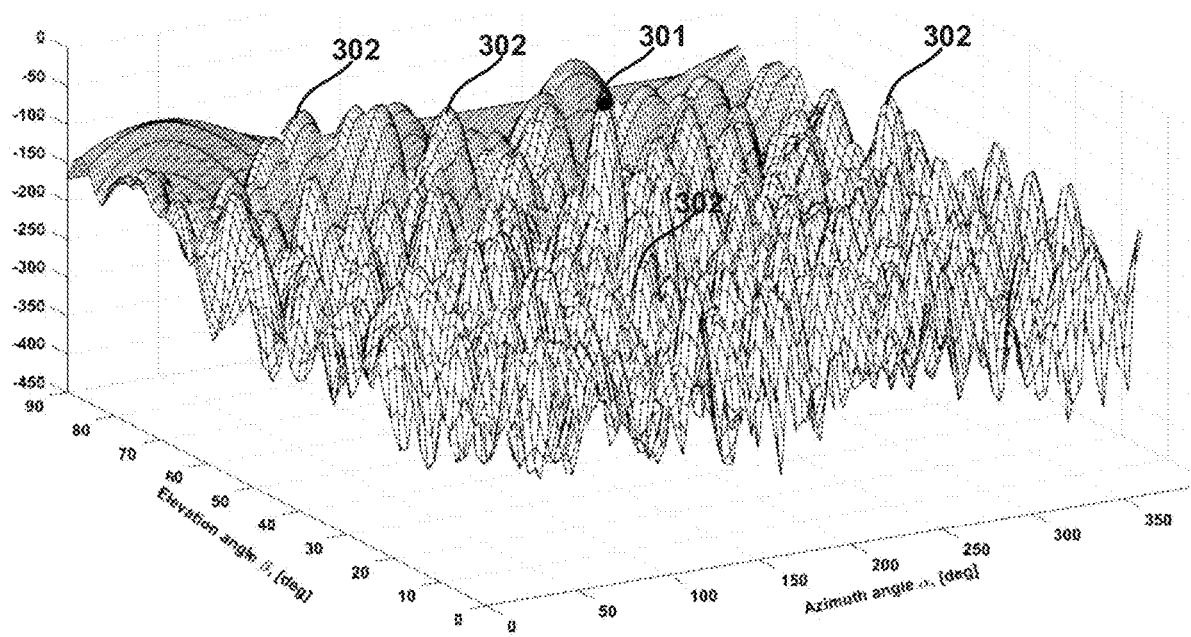
FIG. 3 shows a typical view of the multimodal likelihood function for the base vector attitude determination by fractional parts of differences of full carrier phases.

FIG. 3 shows a typical shape view of the likelihood function $L_F$ ($\Delta\varphi|\eta$, $\xi$, $\alpha$, $\beta$) for $\alpha_{TRU}=180°$ 201, $\beta_{TRU}=45°$ 202, D=1 m. Carrier phase differences are received on single wavelength $\lambda_{L1}=0.19$ cm. This function has many local maxima Only one maximum 301 is true and corresponds to the correct NLSM solution. All other maxima 302 are false. When assigning initial values $\hat{\alpha}_0$, $\hat{\beta}_0$ near false maxima 302, iterative procedure (5), (8), (7) converges to an incorrect solution. The value of true maximum 301 has no significant difference in comparison with values of false maximum 302. It makes impossible to use a two-dimensional search of the maximum value of the likelihood $L_F$ ($\Delta\varphi|\eta$, $\xi$, $\alpha$, $\beta$) to find the neighborhood of true maximum 301.

Figure 4:
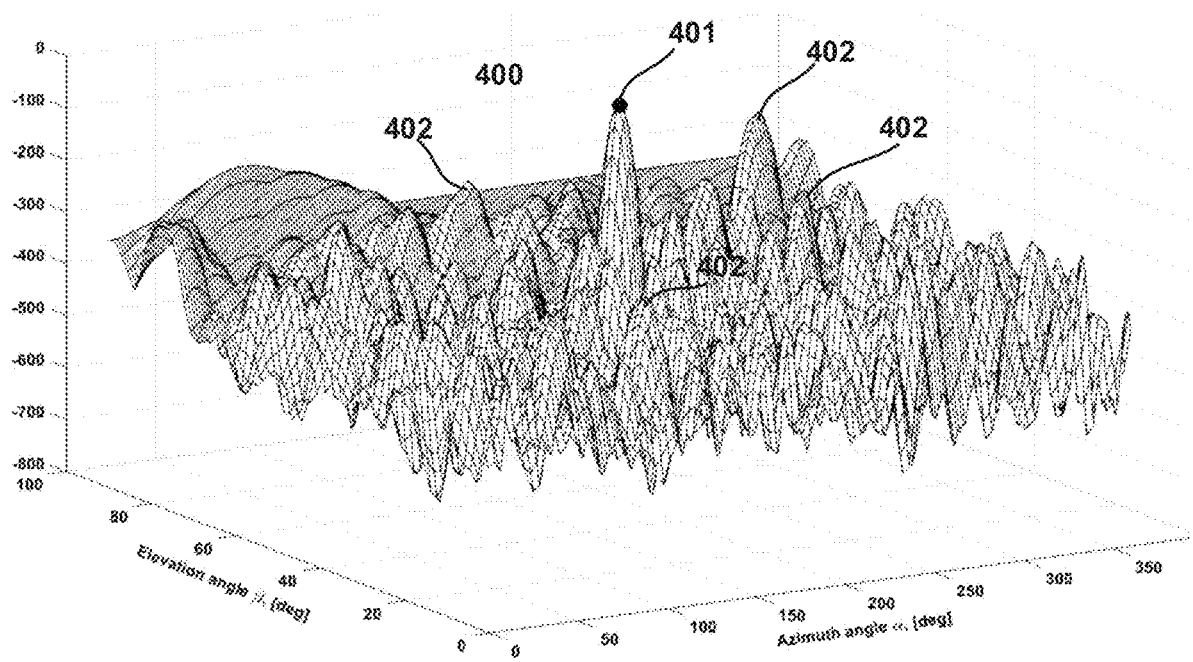
FIG. 4 shows a typical view of the multimodal likelihood function for the base vector attitude determination by fractional parts of differences of full phases received on two carriers.

FIG. 4 shows typical shape view 400 of the likelihood function $L_F$ ($\Delta\varphi|\eta$, $\xi$, $\alpha$, $\beta$) for $\alpha_{TRU}=180°$ 201, $\beta_{TRU}=45°$ 202, D=1 m. Carrier phase differences are received on two wavelengths $\lambda_{L1}=0.19$ cm and $\lambda_{L2}=0.24$ cm. Using two carrier frequencies allows to increase the value of true maximum 401 in comparison with false maxima 402. This new property of the maximum 401 allows to find its neighborhood by a two-dimensional search on the maximum value of the likelihood $L_F$ ($\Delta\varphi|\eta$, $\xi$, $\alpha$, $\beta$). This neighborhood may be used to select initial $\hat{\alpha}_0$, $\hat{\beta}_0$ values for iteration procedure (5), (8), (7).

Figure 5:
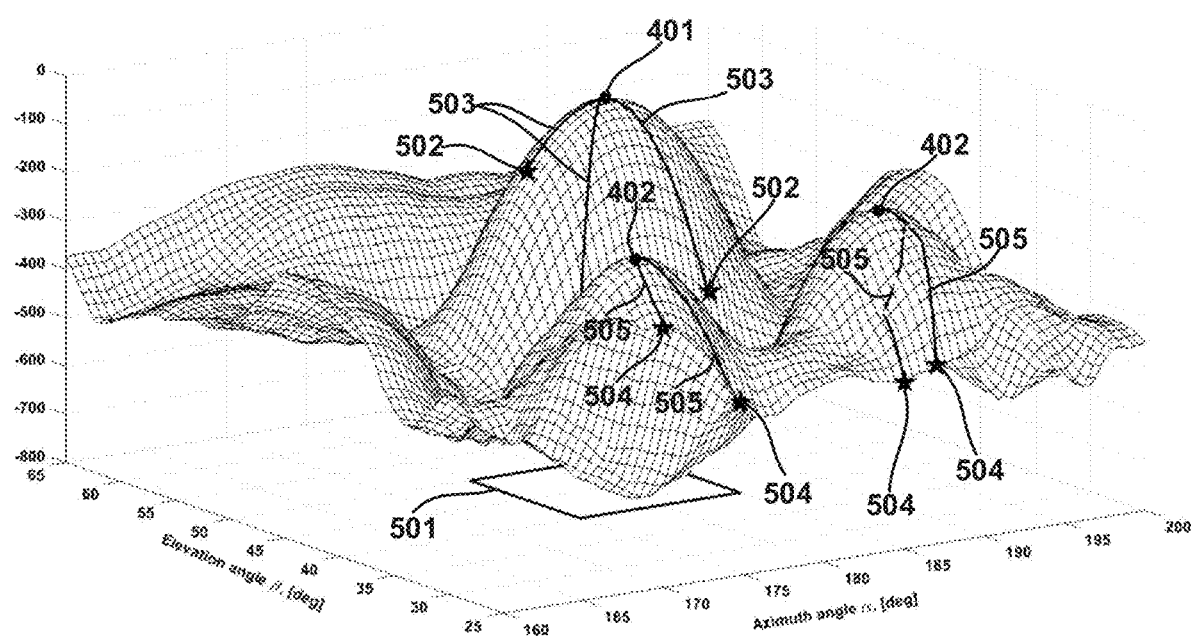
FIG. 5 shows an enlarged view of the true maximum and closest false maxima for the multimodal likelihood function.

FIG. 5 shows an enlarged image of the true maximum 401 and two closest false maxima 402. Acceptable range 501 for initial values $|\alpha_{TRU} - \hat{\alpha}_0| \leq 5°$, $|\beta_{TRU} - \hat{\beta}_0| \leq 5°$ is much smaller in comparison with acceptable range 204 for unimodal likelihood function. All initial values 502 located inside this range 501 provide correct convergence trajectories 503 which lead to $\alpha_{TRU}$, $\beta_{TRU}$. But taking initial values 504 outside this range results in incorrect convergence trajectories 505. These trajectories lead to different false maxima 402.

Figure 6:
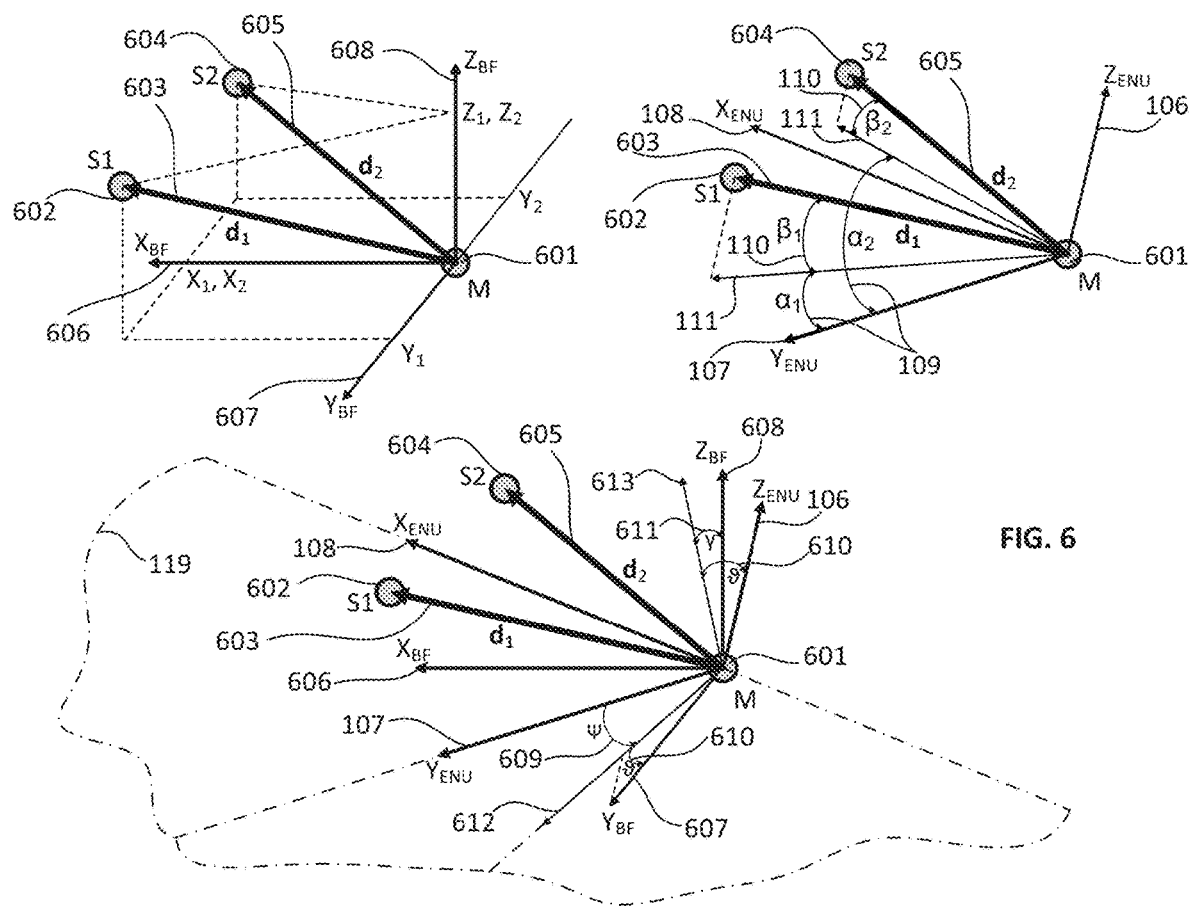
FIG. 6 shows an arrangement of tri antennas and reference frames for attitude measurement.

FIG. 6 illustrates an arrangement of three antennas and reference frames to measure an attitude of a vehicle. This tri-antenna arrangement consists of two master-slave antennas pairs 118. One master-slave antennas pair 118 consists of a master antenna M 601, a slave antenna S1 601 and a base vector $d_1$ 603. Another master-slave antennas pair 118 consists of the master antenna M 601, a slave antenna S2 604 and a base vector $d_2$ 605. The master antenna 601 is common for both master-slave antennas pairs. The vehicle has its own BF axes connected with it: $X_{BF}$ axis 606, $Y_{BF}$ axis 607 and $Z_{BF}$ axis 608.

Directions of base vectors $d_1$ 603 and $d_2$ 605 with respect to the BF are given in the form of their coordinates: $d_{1BF} = [X_1\ Y_1\ Z_1]^T$, $d_{2BF} = [X_2\ Y_2\ Z_2]^T$. These coordinates are determined when the tri-antenna system is installed. Directions of these base vectors with respect to the ENU are given in the form of their angular coordinates: azimuth angles 109 and elevation angles 110. Azimuth and elevation angles for the base vector $d_1$ 603 are $\alpha_1$, $\beta_1$. Azimuth and elevation angles for the base vector $d_2$ 605 are $\alpha_2$, $\beta_2$. Cartesian coordinates of these base vectors with respect to ENU are:

$$d_{1ENU} = D_1[-s_{\alpha 1}c_{\beta 1}c_{\alpha 1}c_{\beta 1}s_{\beta 1}]^T D_1 = \sqrt{X_1^2 + Y_1^2 + Z_1^2}$$

$$d_{2ENU} = D_2[-s_{\alpha 2}c_{\beta 2}c_{\alpha 2}c_{\beta 2}s_{\beta 2}]^T D_2 = \sqrt{X_2^2 + Y_2^2 + Z_2^2} \quad (9)$$

where: $s_x = \sin(x)$, $c_x = \cos(x)$, $x = \alpha_1$, $\beta_1$, $\alpha_2$, $\beta_2$; $D_1$—the length of the base vector $d_1$ 603; $D_2$—the length of the base vector $d_2$ 605.

The attitude of the vehicle is measured as attitude of the BF with respect to the ENU. The ENU frame has three axes connected with the Earth ellipsoid: XENU 108, YENU 107, ZENU 106. The attitude of the BF with respect to the ENU may be described as three Euler angles: yaw angle $\psi$ 609, pitch angle $\vartheta$ 610, roll angle $\gamma$ 611. Yaw angle $\psi$ 609 is the angle between YENU axis 107 and the orthogonal projection 612 of YBF axis 607 to the local plane 119. Pitch angle $\vartheta$ 610 is the angle between the orthogonal projection 612 and YBF axis 607. The same angle $\vartheta$ 610 arises between ZENU axis 106 and vector 613. This vector 613 is perpendicular to YBF axis 607 and lies into the plane formed by $Y_{BF}$ axis 607 and $Z_{ENU}$ axis 106. Roll angle $\gamma$ 611 is the angle between vector 613 and $Z_{BF}$ axis 608. Also, the attitude of the BF with respect to the ENU may be described as a direction cosine matrix (or a coordinate transformation matrix) $S_{BF}^{ENU}$:

$$S_{BF}^{ENU} = \begin{Vmatrix} c_\psi c_\gamma - s_\psi s_\vartheta s_\gamma & s_\psi c_\gamma + c_\psi s_\vartheta s_\gamma & -c_\vartheta s_\gamma \\ -s_\psi c_\vartheta & c_\psi c_\vartheta & s_\vartheta \\ c_\psi s_\gamma + s_\psi s_\vartheta c_\gamma & s_\psi s_\gamma - c_\psi s_\vartheta c_\gamma & c_\gamma c_\vartheta \end{Vmatrix}, \quad (10)$$

$$S_{ENU}^{BF} = (S_{BF}^{ENU})^{-1} = (S_{BF}^{ENU})^T$$

where: $s_x = \sin(x)$, $c_x = \cos(x)$, $x = \psi$, $\vartheta$, $\gamma$.

Figure 7:
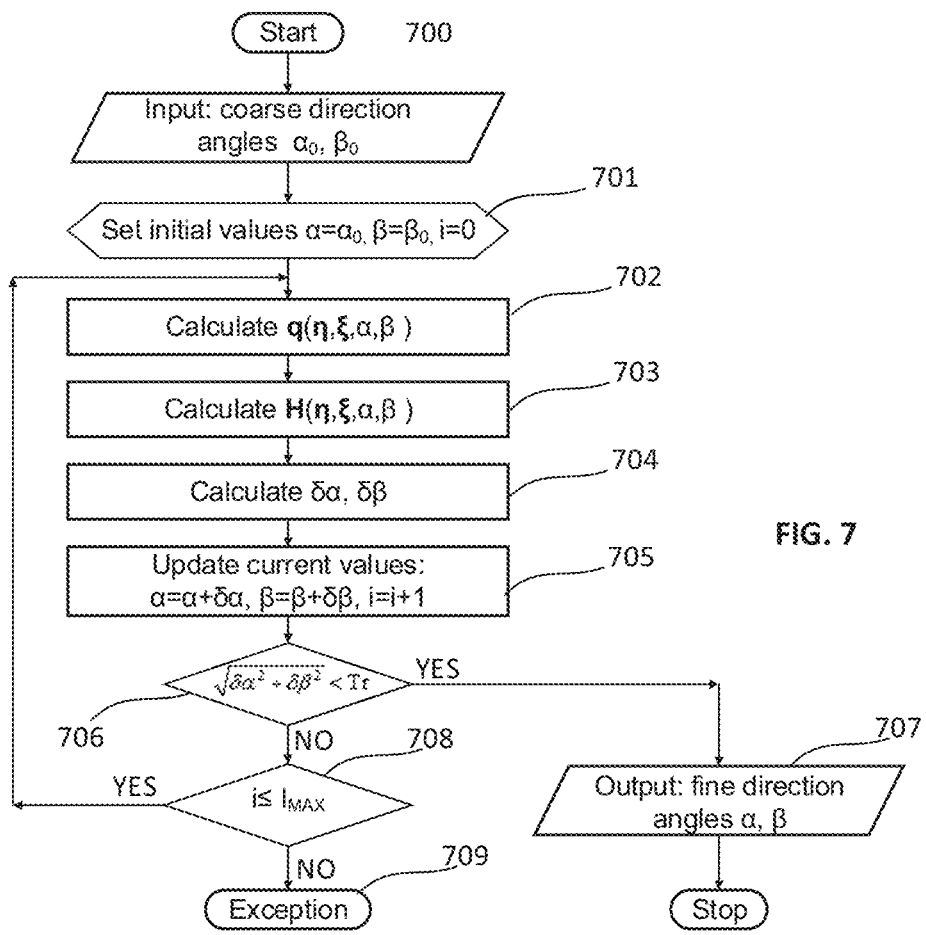
FIG. 7 shows a block diagram of iterative algorithm for attitude determination of the base vector between two antennas.

FIG. 7 is a block diagram of algorithm 700 for iterative calculation of direction angles of base vector 105. An iterative algorithm 700 implements consequent iteration steps (5), (8), (7). When it starts the algorithm receives initial values $\hat{\alpha}_0$, $\hat{\beta}_0$ to initialize 701 iteration parameters $\alpha$, $\beta$. These values are used into 702 to calculate current value of q—the fractional part of the phase differences in accordance with (8). Next, the Jacobian matrix $H(\eta, \xi, \alpha, \beta)$ is calculated into 703 in accordance with (5). Values of corrections $\delta\alpha$, $\delta\beta$ are calculated into 704 as correction vector $\delta\hat{x} = [\delta\alpha\ \delta\beta]^T$ in accordance with (8). New iterative estimates $\alpha$, $\beta$ are received after update stage 705 in accordance with (7). The norm of update vector $\|\xi\hat{x}\|$ is checked in 706 after each update stage 705. If this norm is less than the predefined threshold TR, the iteration process 700 is completed correctly. In this case the last estimates of $\alpha$ and $\beta$ are accepted into 707 as final estimates of direction angles of base vector 105. In the opposite case, when the value of $\|\delta\hat{x}\|$ is greater than the predefined threshold, the iterations continue.

Iteration counter i is checked in 708. If the value of this counter is greater than maximum iteration number $I_{MAX}$ but decision 706 not satisfied, it indicates a numerical problem of iteration algorithm 700. This algorithm must be abnormally terminated with exception 709. In other cases, if the iteration counter is less than $I_{MAX}$, the iteration algorithm 700 returns to 702 with new estimates of $\alpha$ and $\beta$.

Figure 8:
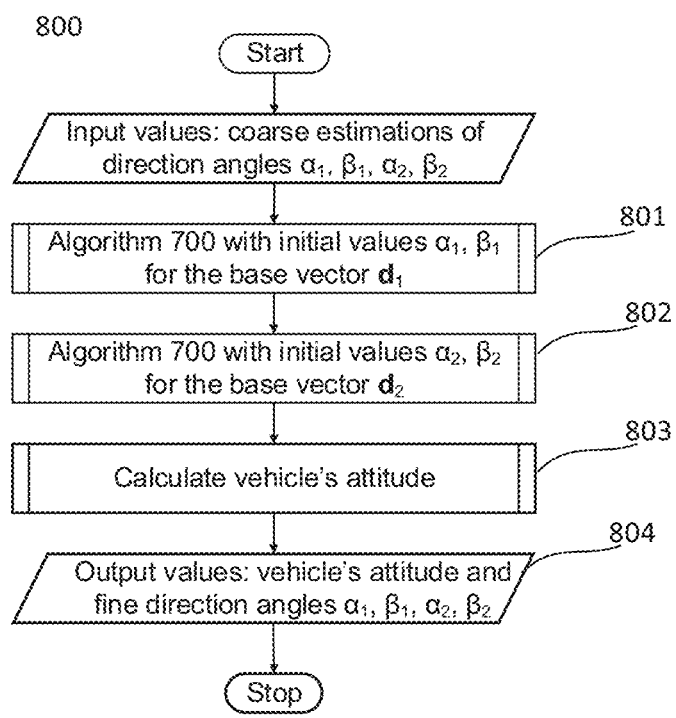
FIG. 8 shows a block diagram of the determination algorithm of the attitude parameters based on GNSS measurements.

FIG. 8 is a block diagram of tri-antenna attitude determination algorithm 800. After start of algorithm 800 it consequently runs two copies 801 and 802 of algorithm 700 to calculate direction angles for base vector $d_1$ 603 and for base vector $d_2$ 605.

Next step is calculation 803 of the vehicle's attitude. In one embodiment, the well-known algorithm TRIAD is used for this purpose. To describe one exemplary implementation of TRIAD algorithm, we should receive coordinates of $d_1$ 603 and $d_2$ 605 vectors with respect to the ENU and with respect to the BF. Constant coordinates $d_{1BF}$ and $d_{2BF}$ with respect to the BF are measured after installation of an attitude measurement system. Variable coordinates $d_{1ENU}$, $d_{2ENU}$ with respect to the ENU are calculated from the appropriate direction angles in accordance with (9). Coordinate transformation matrix (10) connects two different coordinate sets of the base vectors: $d_{1ENU} = S_{BF}^{ENU} d_{1BF}$, $d_{2ENU} = S_{BF}^{ENU} d_{2BF}$ Arranging these coordinate sets in two matrixes:

$$A_{BF} = \left[ \frac{d_{1BF}}{|d_{1BF}|}\ \frac{d_{2BF}}{|d_{1BF}|}\ \frac{d_{1BF} \times d_{2BF}}{|d_{1BF} \times d_{2BF}|} \right] \quad (11)$$

$$A_{ENU} = \left[ \frac{d_{1ENU}}{|d_{1ENU}|}\ \frac{d_{2ENU}}{|d_{2ENU}|}\ \frac{d_{1ENU} \times d_{2ENU}}{|d_{1ENU} \times d_{2ENU}|} \right].$$

These two matrices permit calculation of the the coordinate transformation matrix: $S_{ENU}^{BF} = A_{ENU} A_{BF}^{-1}$. This matrix $S_{ENU}^{BF}$ is the output vehicle's attitude matrix calculated in 803.

In another embodiment $S_{ENU}^{BF}$ may be calculated via the SVD (singular value decomposition) as described in [1]. Coefficients of $S_{ENU}^{BF}$ matrix may be recalculated to other types of attitude parameters, if required: Euler angles or quaternions. Output data 804 of algorithm 800 contain vehicle's attitude and directional angles for the two base vectors $d_1$ 603 and $d_2$ 605.

Special requirements to antennas arrangement can remove cumbersome vector-matrix calculations (11). The master antenna 601 can be placed in an apex of an isosceles triangle and slave antennas 602 and 604 in the opposite ends of a base of the isosceles triangle. In this arrangement base vectors $d_1$ 603 and $d_2$ 605 coincide with opposite legs of the isosceles triangle. The vertical symmetry axis of this isosceles triangle must be aligned with the positive direction of the vehicle's longitudinal axis. The base of this isosceles triangle must be aligned with the positive direction of the transverse axis of the vehicle. In this case the base vectors $d_1$ 603 and $d_2$ 605 have the following coordinates with respect to the BF: $d_{1BF} = [X\ Y\ 0]^T$, $d_{2BF} = [-X\ Y\ 0]^T$, $Y > 0$. The direction of the vehicle's longitudinal axis is described as the geometrical sum vector:

$$d_\Sigma = [X_\Sigma Y_\Sigma Z_\Sigma]^T = d_1 + d_2.$$

The direction of the vehicle's transverse axis is described as the geometrical difference vector $$d_\Delta = [X_\Delta Y_\Delta Z_\Delta]^T = d_1 - d_2.$$

Scalar components of vector $d_{\Sigma ENU}$ and vector $d_{\Delta ENU}$ calculated according (9) contain all required information about vehicle's yaw angle $\psi$ to 609, pitch angle $\vartheta$ 610:

$$\psi = \begin{cases} \arccos \dfrac{Y_{\Sigma ENU}}{\sqrt{X_{\Sigma ENU}^2 + Y_{\Sigma ENU}^2}}, & X_{\Sigma ENU}^2 \leq 0 \\ 2\pi - \arccos \dfrac{Y_{\Sigma ENU}}{\sqrt{X_{\Sigma ENU}^2 + Y_{\Sigma ENU}^2}}, & X_{\Sigma ENU}^2 \leq 0 \end{cases},$$

$$\vartheta = \arcsin \dfrac{Z_{\Sigma ENU}}{\sqrt{X_{\Sigma ENU}^2 + Y_{\Sigma ENU}^2 + Z_{\Sigma ENU}^2}}.$$

If a vehicle's flip does not matter, roll angle $\gamma$ 611 may also be calculated from $d_{\Sigma ENU}$ and $d_{\Delta ENU}$:

$$\gamma = \arcsin \dfrac{-Z_\Delta}{\cos \vartheta |d_{\Delta ENU}|}.$$

Figure 9:
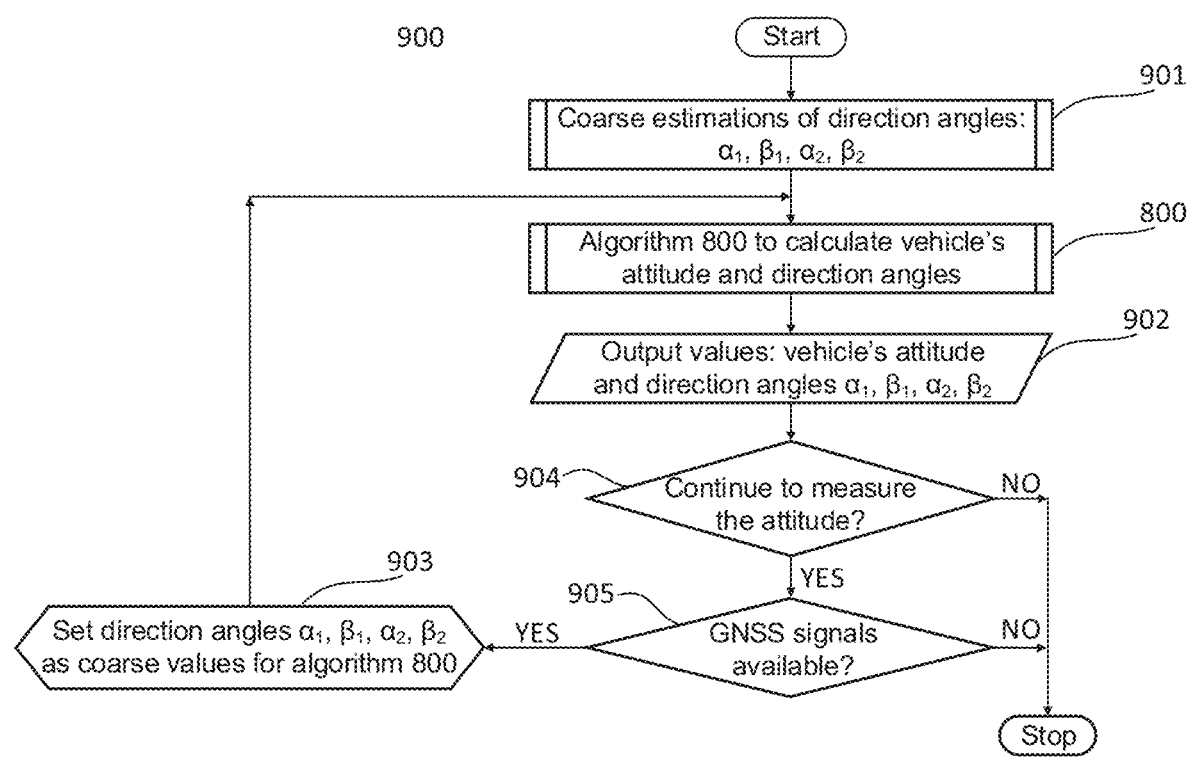
FIG. 9 shows a block diagram of tri-antenna GNSS-only vehicle's attitude measurement algorithm.

FIG. 9 is a block diagram of a GNSS-only tri-antenna vehicle's attitude measurement algorithm 900. This algorithm 900 starts only if GNSS signals are simultaneously available for the slave antennas 602, 604 and for the master antenna 601 and the GNSS receiver can determine the position of master antenna 601. This positioning information is used to calculate coarse estimates of direction angles $\alpha_1$, $\beta_1$, $\alpha_2$, $\beta_2$. Procedure 901 of coarse estimates provides values of $\alpha_1$, $\beta_1$ located inside acceptable range 501 for base vector $d_1$ 603 and values of $\alpha_2$, $\beta_2$ located inside acceptable range 501 for base vector $d_2$ 605. In one embodiment procedure 901 implements two simultaneous moving-base RTK. One moving-base RTK is running between master antenna 601 and slave antenna 602 and provides the coarse estimates of $\alpha_1$, $\beta_1$. Another one moving-base RTK is running between master antenna 601 and slave antenna 604 and provides coarse estimates of $\alpha_2$, $\beta_2$.

In another embodiment procedure 901 implements two simultaneous two-dimensional searches over the multimodal likelihood function 400. One two-dimensional search is running to find the acceptable neighborhood 501 of the true maximum 401 for the antennas pair 601 and 602. This neighborhood is used to select the coarse values of $\alpha_1$, $\beta_1$. Another one two-dimensional search is running to find the acceptable neighborhood 501 of the true maximum 401 for antennas pair 601 and 605. This neighborhood is used to select the coarse values of $\alpha_2$, $\beta_2$.

Other algorithms also can be implemented inside procedure 901 to provide the coarse estimates of the direction angles of base vectors $d_1$ 603 and $d_2$ 605. These coarse estimates are used to initialize attitude determination algorithm 800. This algorithm 800 provides fine estimates of direction angles and vehicle's attitude parameters 902. This data 902 is used as output data of algorithm 900. Also, this data is used inside 903 to set the coarse estimates of direction angles for the next measurement of a vehicle's attitude.

Algorithm 900 stops if no new attitude measurement after receiving of data 902 is required in 904. If the next attitude measurement is required, the availability of GNSS signals for this measurement must be checked 905. If the GNSS signals are available, the data 902 received at the previous attitude measurement is set as coarse estimates of the direction angles 903 for the new attitude measurement.

Figure 10:
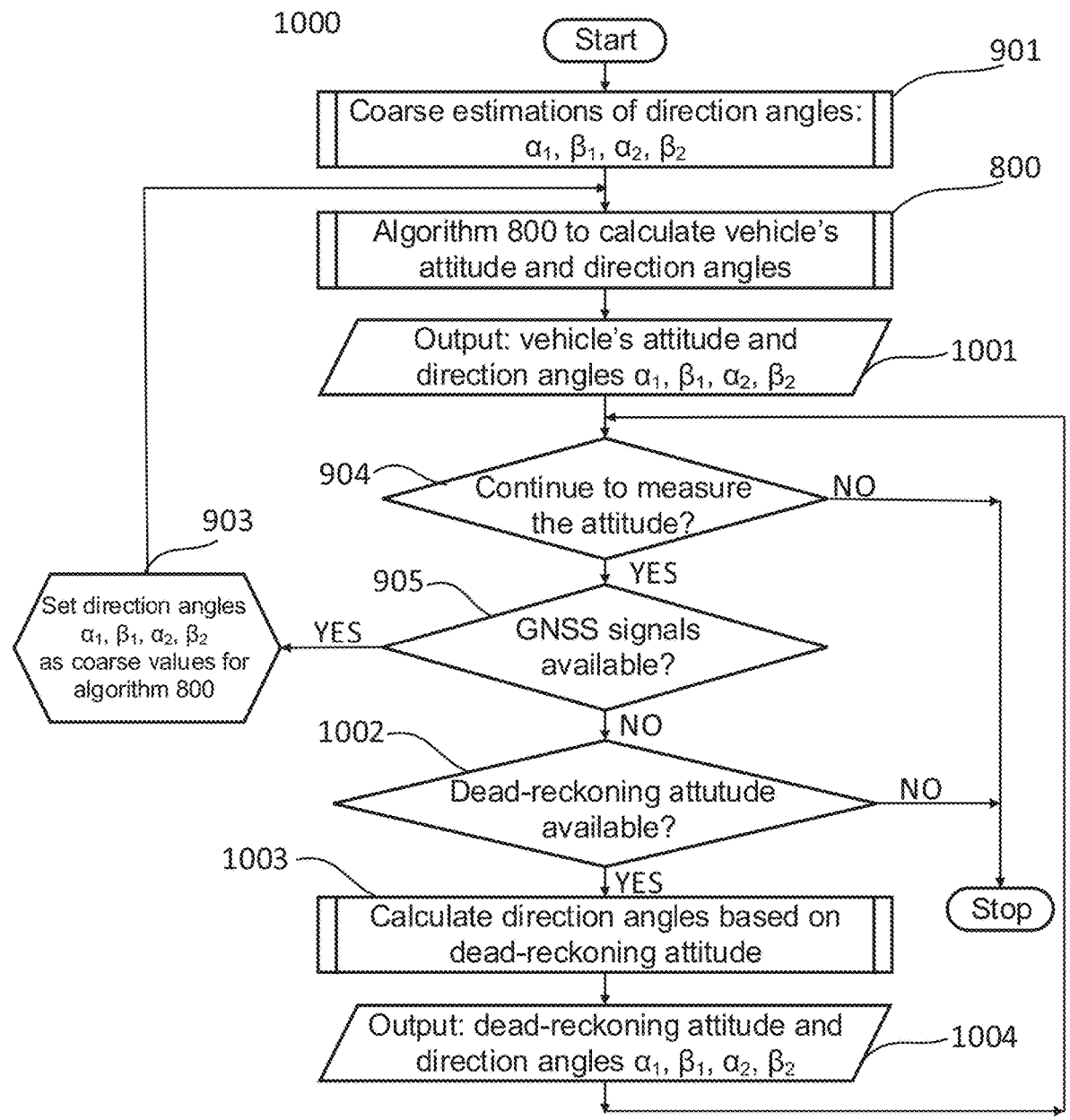
FIG. 10 shows a block diagram of tri-antenna vehicle's attitude measurement algorithm with IMU data.

FIG. 10 is a block diagram of tri-antenna vehicle's attitude measurement algorithm 1000 with using of an IMU data. This algorithm 1000 starts only if GNSS signals are simultaneously available for slave antennas 602, 604 and for master antenna 601 and the GNSS receiver can determine the position of master antenna 601. In this case output data 1001 for the algorithm 1000 are provided by the algorithm 800. If the GNSS measurements are available for the next measurement instant, output data 1001 is used as coarse estimates of direction angles for the algorithm 800.

If the GNSS measurements are not available for the current attitude measurement instant, the algorithm 1000 checks 1002 availability of a dead-reckoning attitude provided by an external IMU data processing algorithm. This dead-reckoning attitude is available for a limited period of time after beginning of a GNSS outage. If the duration of the GNSS outage is longer than this period of time, the dead-reckoning attitude become unavailable. The duration of the dead-reckoning period is determined by IMU quality, IMU data external processing algorithm structure and sizes of acceptable ranges 501.

If check 1002 shows the availability of the dead-reckoning attitude, this attitude is used for direction angles calculation algorithm 1003. In one embodiment this dead-reckoning attitude is presented as transformation matrix $S_{ENU}^{BF}$. This matrix is used by the algorithm 1003 to calculate the coordinates of the base vectors 603 and 605 with respect to the ENU:

$$d_{1ENU} = \begin{bmatrix} X_{1ENU} \\ Y_{1ENU} \\ Z_{1ENU} \end{bmatrix} = S_{ENU}^{BF} d_{1BF}, \quad d_{2ENU} = \begin{bmatrix} X_{2ENU} \\ Y_{2ENU} \\ Z_{2ENU} \end{bmatrix} = S_{ENU}^{BF} d_{2BF}.$$

The dead-reckoning direction angles are calculated by the algorithm 1003 as follows (i=1,2):

$$\alpha_i = \begin{cases} \arccos\left(Y_{iENU}/\sqrt{X_{iENU}^2 + Y_{iENU}^2}\right), & X_{iENU} \leq 0 \\ 2\pi - \arccos\left(Y_{iENU}/\sqrt{X_{iENU}^2 + Y_{iENU}^2}\right), & X_{iENU} > 0 \end{cases}, \quad (11)$$

$$\beta_i = \arcsin \dfrac{Z_{iENU}}{\sqrt{X_{iENU}^2 + Y_{iENU}^2 + Z_{iENU}^2}}$$

Dead-reckoning angles (11) are used as output data 1004 of the algorithm 1000 during the GNSS outage, but with the dead reckoning attitude available. If the GNSS measurements become available after the outage during the dead-reckoning period dead-reckoning angles 1004 are used as coarse direction angles for algorithm 800.

Figure 11:
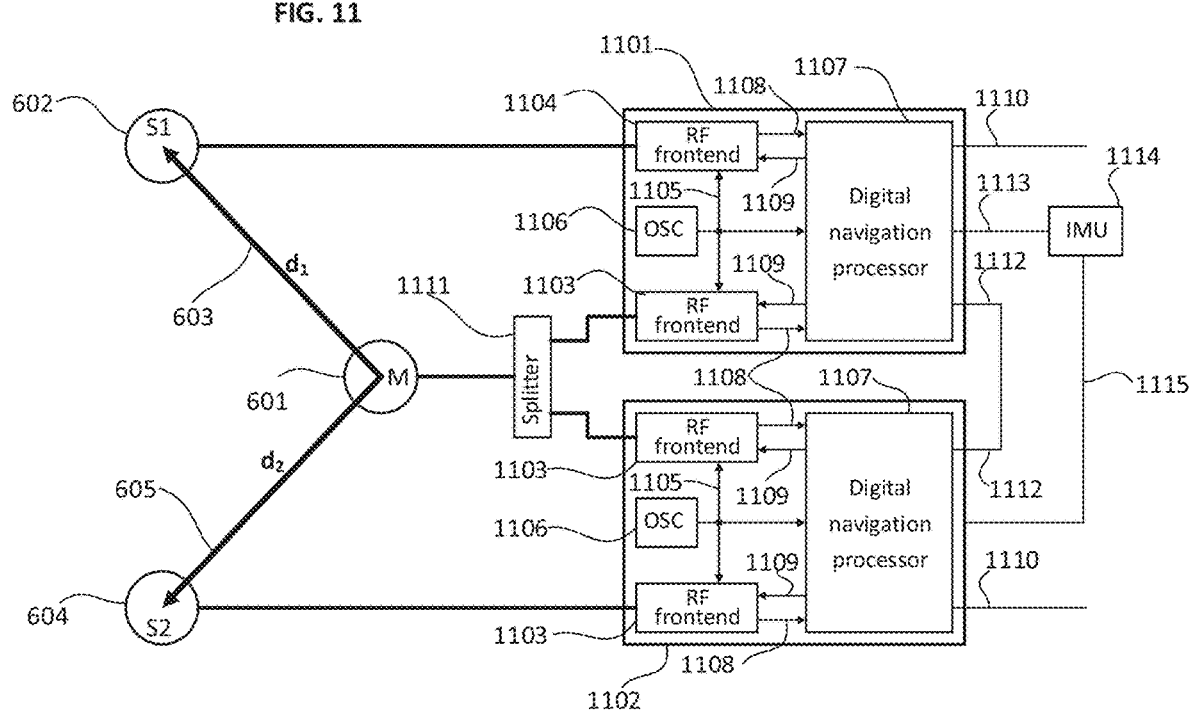
FIG. 11 shows a block diagram of tri-antenna receiver with two separate dual-antenna receivers.

FIG. 11 is a block diagram of the tri-antenna GNSS receiver intended for vehicle's attitude measurements. This tri-antenna receiver consists of two hardware-identical two-antennas GNSS receivers 1101 and 1102. Two-antenna receivers 1101 and 1102 are specially designed to provide GNSS interferometric measurements of the base vector's direction angles according to the algorithm 700. These receivers include two radiofrequency (RF) front ends 1103 and 1104. The first RF front-end 1103 is used for positioning and can receive a wide spectrum of GNSS signals. The first RF front-end 1103 is used typically to connect to the master antenna 101. The second RF front-end 1104 is used for GNSS interferometrical measurements. The second RF front-end 1104 only receives such GNSS signals that are used for interferometry. The second RF front-end 1104 is used typically to connect to the slave antenna 102.

Both RF front ends 1103 and 1104 are fed by a common frequency signal 1105 generated by a local oscillator 1106. The local oscillator 1106 also feeds digital navigation processor 1107. The digital navigation processor 1107 receives I and Q components 1108 of the received GNSS signals and transmits control signals 1109 for the RF front ends 1103 and 1104.

The navigation processor 1107 has two parts—a navigation part and a system part. The navigation part performs a demodulation of I and Q components 1108, the GNSS signal acquisition and tracking, code and phase measurements, and determination of position and velocity. The system part of navigation processor 1107 provides an overall control of the GNSS receiver, receiver's status indication, etc. Also, the system part of navigation processor 1107 provides operation of external interfaces 1110, 1112, 1113 for bidirectional navigation and other data transfers between the GNSS receivers and external devices. One exemplary embodiment of an external device is an external IMU 1114 connected to the receiver 1101 via an external interface 1113.

In this embodiment the master antenna 601 is connected to the navigation RF frontends 1103 of both GNSS receivers 1101 and 1102 via an RF splitter 1111. Slave antennas are connected to appropriate interferometric RF frontends 1104. Slave antenna 602 is connected to the RF frontend 1104 of the receiver 1101. Slave antenna 604 is connected to the RF frontend 1104 of the receiver 1102. This way of antenna connection provides two non-colinear base vectors 603 and 605 with common origin. The origin of these two base vectors is located at the phase center of master antenna 601.

GNSS receivers 1101 and 1102 simultaneously measure phase differences between appropriate master and slave antennas. Receiver 1101 measures phase difference between 601 and 602 antennas pair. Receiver 1102 measures phase difference between 601 and 605 antennas pair. Receiver 1102 transmits its measurements to receiver 1101 via the external interface 1112. Receiver 1101 uses its own measurements and the measurements received from receiver 1102 to calculate the vehicle's attitude. If the external IMU 1114 is not connected to receiver 1101 it uses the algorithm 900 calculate the vehicle's attitude. If the external IMU 1114 is connected to the receiver 1101 via the external interface 1113, it uses the algorithm 1000 to calculate the vehicle's attitude.

In one embodiment of the IMU 1114, it has several data interfaces which can be connected to various devices independently from each other. If the IMU 1114 has this feature it connects to the receiver 1102 via an external interface 1115.

Figure 12:
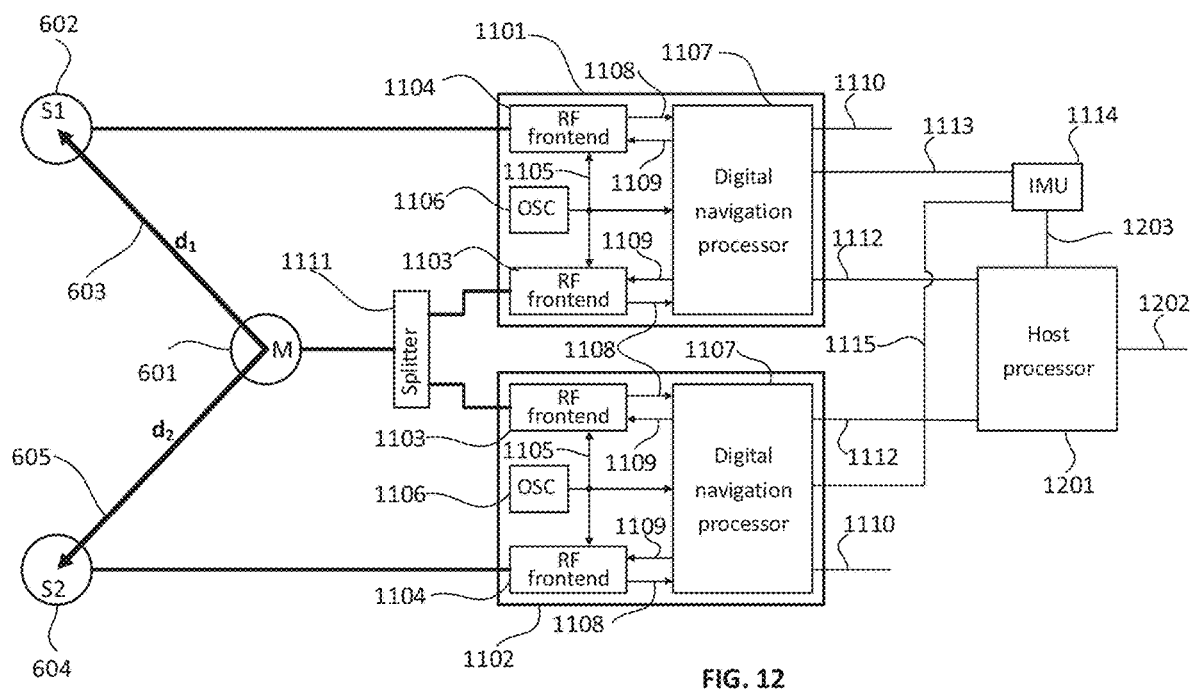
FIG. 12 shows a block diagram of tri-antenna receiver with two separate dual-antenna receivers and an additional host processor.

FIG. 12 is a block diagram of the tri-antenna GNSS receiver intended for vehicle's attitude measurements. This tri-antenna receiver consists of two hardware-identical two-antennas GNSS receivers 1101 and 1102. Both receivers are connected to common host processor 1201 via external the interfaces 1112. Host processor 1201 has its own external interface 1202 to interchange data with external devices. Also host processor 1201 has external interface 1203 to connect external IMU 1114. If external IMU 1114 has the multichannel feature it also connects to receivers 1101 and 1102 via separate external interfaces 1113 and 1115 respectively.

Both GNSS receivers 1101 and 1102 send their phase measurements to host processor 1201 via external interfaces 1112. Also, the GNSS receivers 1101 and 1102 send the measurements or the direction angles of appropriate base vectors 603 and 605. The host processor 1201 calculates the vehicle's attitude based on these angular measurements according to the algorithm 900. If the IMU 1114 is connected to the host processor 1201 via an external interface 1203 the vehicle's attitude is calculated by the host processor 1201 according to the algorithm 1000.

Figure 13:
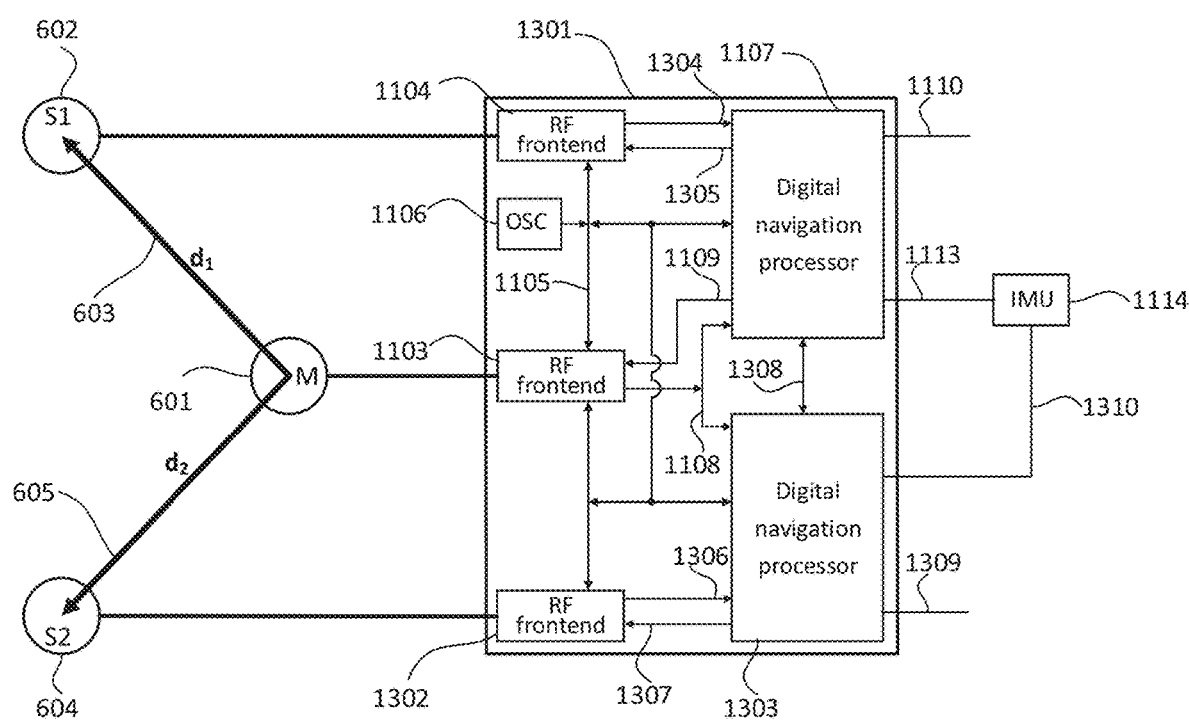
FIG. 13 shows a block diagram of tri-antenna receiver containing two internal digital navigation processors.

FIG. 13 is a block diagram of the tri-antenna GNSS receiver intended for vehicle's attitude measurements. This receiver 1301 contains a first RF frontend 1103 for the master antenna 601 connection, a second RF front end 1104 for the first slave antenna 602 connection and a third RF front end 1302 for the second slave antenna 604 connection. The second RF front end 1104 has hardware identical to the third RF frontend 1302. The first RF frontend 1103 simultaneously transmits I and Q components received by master antenna 601 to the digital navigation processor 1107 and to a digital navigation processor 1303 via interface 1108. The navigation processor 1107 controls the first RF frontend via control interface 1109. The second RF frontend 1104 is connected to navigation processor 1107 via I and Q interface 1304 and control interface 1305. The third RF frontend 1302 is connected to navigation processor 1303 via I and Q interface 1306 and a control interface 1307. Both navigation processors 1107 and 1301 are connected to each other via in-circuit 1308. The three RF frontends 1103, 1104 1302 and the two navigation processors 1107 and 1303 are fed by the same frequency signal 1105 generated by the local oscillator 1106.

Both navigation processors 1107 and 1301 have bidirectional external interfaces 1110, 1113 and 1309 to connect external devices. One exemplary embodiment of an external device is the external IMU 1114 connected to the navigation processor 1107 via the external interface 1113. In another exemplary embodiment external IMU 1114 has the multi-channel feature and is connected to the navigation processors 1107 and 1303 via separate external interfaces 1113 and 1310.

The navigation processors 1107 and 1303 simultaneously measure phase differences between appropriate master and slave antennas. Navigation processor 1107 measures phase difference between the 601 and 604 antennas pair. Navigation processor 1303 measures phase difference between the 601 and 602 antennas pair. Navigation processor 1303 transmits its measurements to the navigation processor 1107 via an in-circuit interface 1308. Navigation processor 1107 uses its own measurements and the measurements received from the navigation processor 1303 to calculate the vehicle's attitude. If the external IMU 1114 is not connected to navigation processor 1107 it uses the algorithm 900 calculate a vehicle's attitude. If the external IMU 1114 is connected to navigation processor 1107 via external interface 1113 it uses the algorithm 1000 to calculate the vehicle's attitude.

Figure 14:
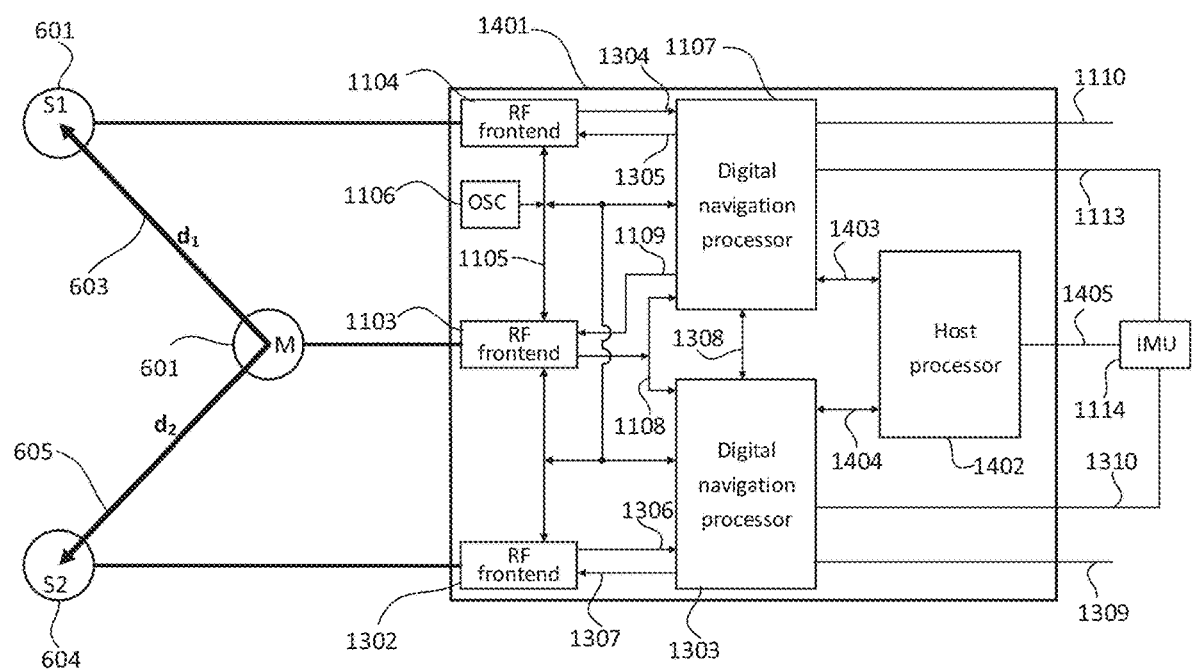
FIG. 14 shows a block diagram of tri-antenna receiver containing two internal digital navigation processors and additional internal host processor.

FIG. 14 is a block diagram of the tri-antenna GNSS receiver intended for vehicle's attitude measurements. This receiver 1401 has three RF frontends 1103, 1104 and 1302, two digital navigation processors 1107 and 1303 and an additional internal host processor 1402. Navigation processor 1107 and navigation processor 1303 are connected to the host processor 1402 via in-circuit interfaces 1403 and 1404 respectively.

Navigation processors 1107 and 1303 simultaneously measure phase differences between appropriate master and slave antennas. Navigation processor 1107 measures phase difference between 601 and 604 antennas pair. The navigation processor 1303 measures phase difference between 601 and 602 antennas pair. Both navigation processors 1107 and 1303 transmit their measurements to host processor 1402 via in-circuit interfaces 1403 and 1404. The host processor 1402 uses these measurements to calculate the vehicle's attitude. If the external IMU 1114 is not connected to the host processor 1402 it uses the algorithm 900 calculate a vehicle's attitude. If the external IMU 1114 is connected to the host processor 1402 via an external interface 1405 it uses the algorithm 1000 to calculate a vehicle's attitude. In one embodiment the external IMU 1114 has the multichannel feature and is connected to the navigation processors 1107 and 1307 and to the host processor 1402 via appropriate separate interfaces 1113, 1310, 1405.

Figure 15:
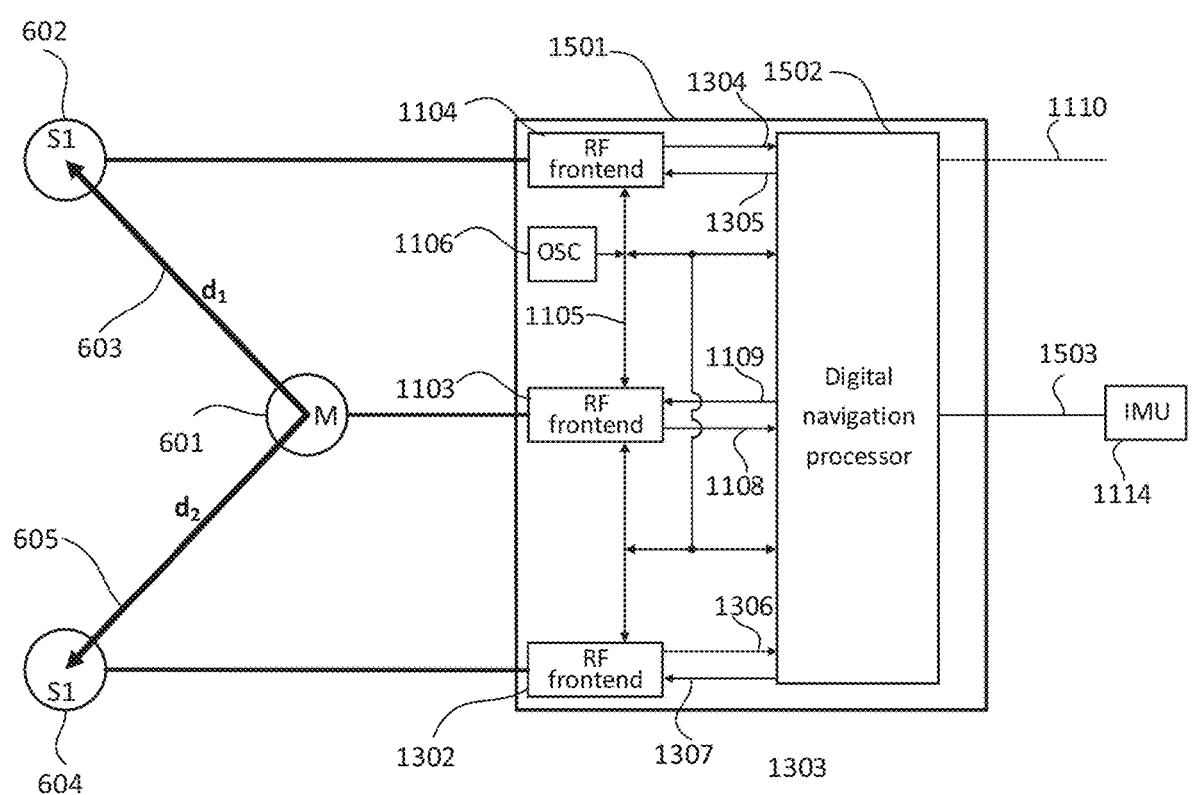
FIG. 15 shows a block diagram of tri-antenna receiver containing single internal digital navigation processors.

FIG. 15 is a block diagram of the tri-antenna GNSS receiver intended for vehicle's attitude measurements. The receiver 1501 contains a first RF frontend 1103, a second RF frontend 1104, a third RF frontend 1302 and a digital navigation processor 1502. The navigation processor 1502 simultaneously measures the phase differences between the 601 and 604 antenna pair and between the 601 and 602 antenna pair. Also, the navigation processor 1502 uses these measurements to calculate the vehicle's attitude. If the external IMU 1114 is not connected to the navigation processor 1502 it uses the algorithm 900 calculate the vehicle's attitude. If the external IMU 1114 is connected to the navigation processor 1502 via an external interface 1503 it uses the algorithm 1000 to calculate a vehicle's attitude.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

REFERENCES (ALL INCORPORATED HEREIN BY REFERENCE IN THEIR ENTIRETY)

1. F. Landis Markley, "*Attitude Determination using Vector Observations and the Singular Value Decomposition*", The Journal of the Astronautical Sciences, Vol. 36, No. 3, July-September 1988, pp. 245-258.
2. U.S. Pat. No. 5,534,875, Attitude Determining System for use with Global Positioning System.
3. U.S. Pat. No. 5,548,293, System and Method for Generating Attitude Determination Using GPS.
4. U.S. Pat. No. 6,005,514, Method for Attitude Determination Using GPS Carrier Phase Measurements from Nonaligned Antennas.
5. U.S. Pat. No. 6,088,653, Attitude Determination Method and System.
6. U.S. Pat. No. 6,424,915 B1, System for Determining the Heading and/or Attitude of a Body. U.S. Pat. No. 6,754,584, Attitude Measurement Using a Single GPS Receiver with Two Closely-Spaced Antennas.

What is claimed is:

1. A method of determining orientation of an object having three GNSS (Global Navigation Satellite System) antennas, comprising: defining two non-collinear base vectors connecting two pairs of the three GNSS antennas; at each GNSS antenna, simultaneously receiving GNSS signals from GNSS satellites; measuring carrier full phases of all the GNSS signals received by the three GNSS antennas at a given moment of time; calculating carrier full phase differences between the measured GNSS carrier full phases; for each GNSS signal received by the three GNSS antennas, calculating fractional parts of the calculated carrier full phase differences; and using the fractional parts of the calculated carrier full phase differences and the base vectors, calculating angular coordinates of the base vectors, and, based on the angular coordinates, calculating the orientation of the object.

2. The method of claim 1, further comprising:
initializing an attitude determination algorithm to determine the angular coordinates of the base vectors close to a true maximum of a likelihood function;
calculating the angular coordinates of the base vectors with the fractional parts of carrier full phase differences.

3. The method of claim 2, further comprising using a moving-base RTK (Real Time Kinematics) method to initialize the attitude determination algorithm in a vicinity of a true maximum of the likelihood function.

4. The method of claim 2, wherein the angular coordinates of the base vector obtained at the previous measurement are used to initialize the attitude determination algorithm in a vicinity of a true maximum of the likelihood function.

5. The method of claim 2, wherein the angular coordinates of the base vectors calculated based on attitude measurements obtained from an inertial navigation system are used to initialize the attitude determination algorithm in a vicinity of a true maximum of the likelihood function.

6. The method of claim 5, wherein the inertial navigation system is a strapdown inertial measurement unit (IMU).

7. The method of claim 1, wherein the base vectors are defined based on phase centers of the three GNSS antennas.

8. The method of claim 1, wherein one of the three GNSS antennas is a master antenna, and the other two GNSS antennas are a first slave antenna and a second slave antenna.

9. A method of determining orientation of an object having three GNSS (Global Navigation Satellite System) antennas, comprising: defining two non-collinear base vectors connecting two pairs of the three GNSS antennas; at each GNSS antenna, simultaneously receiving GNSS signals from GNSS satellites; measuring carrier full phases of all the GNSS signals received by the three GNSS antennas at a given moment of time; calculating carrier full phase differences between the measured GNSS carrier full phases; for each GNSS signal received by the GNSS antennas, calculating fractional parts of the calculated carrier full phase differences; using the fractional parts of the calculated carrier full phase differences and the base vectors, calculating Cartesian coordinates of the base vectors, and, based on the Cartesian coordinates, calculating the orientation of the object.

10. The method of claim 9, wherein a comparison of Cartesian coordinates of the base vectors is calculated by measured angular coordinates and Cartesian base vectors are determined by a TRIAD algorithm.

11. The method of claim 9, wherein the GNSS antennas are arranged so that the base vectors have equal length; a vector of a geometric sum of the base vectors is aligned with a positive direction of a longitudinal axis of the object; a heading angle is calculated as an azimuth angle of a geometric sum of the base vectors; a pitch angle is calculated as an elevation angle of the geometric sum vector of the base vectors; a roll angle is calculated as an elevation angle of a geometric difference vector of the base vectors and based on the previously calculated pitch angle.

12. A GNSS (Global Navigation Satellite System) receiver for measuring orientation of an object, comprising:
first, second and third antennas receiving GNSS signals from GNSS satellites;

each GNSS antenna is connected to a separate RF (radio frequency) front end;
a digital navigation processor for processing of the GNSS signals from the RF front ends;
a common harmonic oscillator connected to the RF front ends and to the digital navigation processor;
wherein two non-collinear base vectors are defined as connecting the first GNSS antenna and the second GNSS antenna, and the first GNSS antenna and the third GNSS antenna;
wherein the processor measures carrier full phases of all the GNSS signals received by the three GNSS antennas at a given moment of time;
wherein the processor calculates carrier full phase differences between the measured GNSS carrier full phases;
wherein, for each GNSS signal received by the three GNSS antennas, the processor calculates fractional parts of the calculated carrier full phase differences; and
the processor calculates angular coordinates of the base vectors using the fractional parts of the calculated carrier full phase differences, and, based on the angular coordinates, calculates the orientation of the object.

13. A GNSS (Global Navigation Satellite System)-based system to measure vehicle's attitude, the system comprising:
a master antenna receiving GNSS signals from GNSS satellites;
a first slave and a second slave antenna receiving GNSS signals from the GNSS satellites;
wherein a first base vector connects the master antenna and the first slave antenna;
wherein a second base vector connects the master antenna and the second slave antenna;
a first RF (radio frequency) front end connected to the master antenna;
second and third RF front ends connected to the first and second slave antennas, respectively;
an RF splitter splitting an output of the first RF front end;
a first dual-antenna GNSS receiver receiving an output of the RF splitter and the second RF front end;
a second dual-antenna GNSS receiver receiving an output of the RF splitter and the third RF front end;
two non-collinear base vectors are defined as connecting the master and first slave antennas, and the master and second slave antennas;
wherein, for the GNSS signals received by the master antenna and the first slave antenna, a processor of the first dual-antenna GNSS receiver measures carrier full phases, then calculates carrier full phase differences between the measured GNSS carrier full phases and then calculates fractional parts of the calculated carrier full phase differences, and then calculates angular coordinates of the first base vector using the fractional parts;
wherein, for the GNSS signals received by the master antenna and the second slave antenna, a processor of the second dual-antenna GNSS receiver measures carrier full phases, then calculates carrier full phase differences between the measured GNSS carrier full phases and then calculates fractional parts of the calculated carrier full phase differences, and then calculates angular coordinates of second first base vector using the fractional parts; and
wherein one of the processors calculates the vehicle's attitude based on based on the angular coordinates of the first and second base vectors.

14. The system of claim 13, wherein
the second dual-antenna GNSS receiver is connected to a first GNSS receiver via external interface; and
the second dual-antenna GNSS receiver transmits its calculation of the angular coordinates of the second base vector to the first dual-antenna GNSS receiver.

15. The system of claim 13, further comprising an inertial measurement unit (IMU) connected to the first dual-antenna GNSS receiver via an external interface.

16. The system of claim 13, further comprising a multi-channel inertial measurement unit (IMU), wherein a first interface of the multichannel IMU is connected to the first dual-antenna GNSS receiver via a first external interface; a second interface of the multichannel IMU is connected to the second dual-antenna GNSS receiver via a second external interface.

17. The system of claim 13, wherein: the first dual-antenna GNSS receiver and the second dual-antenna GNSS receiver are connected to a host processor via their external interfaces; the first GNSS receiver transmits angular coordinates of the first base vector to a host processor via its external interface; the second GNSS receiver transmits angular coordinates of the second base vector to the host processor via its external interface; the host processor determines the vehicle's attitude.

18. The system of claim 17, further comprising a multi-channel inertial measurement unit (IMU) connected to the host processor.

19. The system of claim 13, wherein the first dual-antenna GNSS receiver and the second dual-antenna GNSS receiver are implemented as single integrated receiver.

20. The system of claim 13, wherein the processors of first dual-antenna GNSS receiver and the second dual-antenna GNSS receiver are mounted on the same motherboard.

21. A GNSS (Global Navigation Satellite System)-based system to measure attitude of an object, the system comprising: a master antenna receiving GNSS signals from GNSS satellites; a first slave antenna and a second slave antenna receiving GNSS signals from the GNSS satellites; wherein a first base vector connects the master antenna and the first slave antenna; wherein a second base vector connects the master antenna and the second slave antenna; a first RF (radio frequency) front end connected to the master antenna; a second RF front end and a third RF front end connected to the first slave antennas and the second slave antenna, respectively; an RF splitter splitting an output of the first RF front end; a first dual-antenna GNSS receiver receiving an output of the RF splitter and the second RF front end; a second dual-antenna GNSS receiver receiving an output of the RF splitter and the third RF front end; a host processor connected to the first dual-antenna GNSS receiver and the second dual-antenna GNSS receiver; two non-collinear base vectors are defined as connecting the master antenna and first slave antenna, and the master antenna and the second slave antenna; wherein, for the GNSS signals received by the master antenna and the first slave antenna, a processor of the first dual-antenna GNSS receiver measures carrier full phases and provides them to the host processor; wherein, for the GNSS signals received by the master antenna and the second slave antenna, a processor of the second dual-antenna GNSS receiver measures carrier full phases and provides them to the host processor; wherein the host processor calculates carrier full phase differences between the measured GNSS carrier full phases; wherein, for each GNSS signal received by the GNSS antennas, the host processor calculates fractional parts of the calculated carrier full phase differences; and the host processor calculates angular coordinates of the base vectors using the fractional parts of the calculated carrier full phase differences, and, based on the angular coordinates, calculates the orientation of the object.

* * * * *